United States Patent
Chang et al.

(10) Patent No.: US 11,624,964 B2
(45) Date of Patent: Apr. 11, 2023

(54) ACTIVE PHOTONIC DEVICES INCORPORATING HIGH DIELECTRIC CONSTANT MATERIALS

(71) Applicant: Psiquantum, Corp., Palo Alto, CA (US)

(72) Inventors: Chia-Ming Chang, Palo Alto, CA (US); Hung-Hsi Lin, San Jose, CA (US); Gary Gibson, Palo Alto, CA (US)

(73) Assignee: Psiquantum, Corp., Palo Alto, CA (US)

( * ) Notice: Subject to any disclaimer, the term of this patent is extended or adjusted under 35 U.S.C. 154(b) by 0 days.

(21) Appl. No.: 17/326,233

(22) Filed: May 20, 2021

(65) Prior Publication Data

US 2021/0397064 A1  Dec. 23, 2021

Related U.S. Application Data

(63) Continuation of application No. 16/697,704, filed on Nov. 27, 2019, now Pat. No. 11,036,111, which is a (Continued)

(51) Int. Cl.
*G02F 1/225* (2006.01)
*G02F 1/21* (2006.01)

(52) U.S. Cl.
CPC ............ *G02F 1/2257* (2013.01); *G02F 1/212* (2021.01); *G02F 2203/50* (2013.01)

(58) Field of Classification Search
None
See application file for complete search history.

(56) References Cited

U.S. PATENT DOCUMENTS 6,411,762 B1  6/2002 Anthon et al.
6,490,399 B1  12/2002 Heitmann et al.
(Continued)

FOREIGN PATENT DOCUMENTS

GB  2379994 A  3/2003

OTHER PUBLICATIONS

U.S. Appl. No. 16/365,543, "Non-Final Office Action", dated Aug. 21, 2019, 7 pages.
U.S. Appl. No. 16/365,543, "Notice of Allowance", dated Dec. 18, 2019, 7 pages.
(Continued)

*Primary Examiner* — Jerry Rahll
(74) *Attorney, Agent, or Firm* — Kilpatrick Townsend & Stockton LLP

(57) ABSTRACT

An optical switch structure includes a substrate, a first electrical contact, a first material having a first conductivity type electrically connected to the first electrical contact, a second material having a second conductivity type coupled to the first material, and a second electrical contact electrically connected to the second material. The optical switch structure also includes a waveguide structure disposed between the first electrical contact and the second electrical contact and comprising a waveguide core coupled to the substrate and including a first material characterized by a first index of refraction and a first electro-optic coefficient and a waveguide cladding at least partially surrounding the waveguide core and including a second material characterized by a second index of refraction and a second electro-optic. The first index of refraction is greater than the second index of refraction the first electro-optic coefficient is less than the second electro-optic coefficient

15 Claims, 19 Drawing Sheets

Related U.S. Application Data continuation of application No. 16/365,543, filed on Mar. 26, 2019, now Pat. No. 10,627,696.

(60) Provisional application No. 62/819,765, filed on Mar. 18, 2019.

(56) References Cited

U.S. PATENT DOCUMENTS

| | | |
|---|---|---|
| 6,810,197 B2 | 10/2004 | Allan et al. |
| 7,119,400 B2 | 10/2006 | Burden |
| 9,014,524 B2 | 4/2015 | Bell |
| 9,151,888 B2 | 10/2015 | Mori et al. |
| 10,627,696 B1 | 4/2020 | Chang et al. |
| 11,036,111 B2 | 6/2021 | Chang et al. |
| 2002/0071622 A1 | 6/2002 | Betts et al. |
| 2003/0002834 A1 | 1/2003 | Brown et al. |
| 2003/0013275 A1 | 1/2003 | Burden |
| 2003/0039865 A1 | 2/2003 | Kelsey et al. |
| 2004/0151463 A1 | 8/2004 | Talin et al. |
| 2007/0154137 A1 | 7/2007 | Mino et al. |
| 2008/0157157 A1 | 7/2008 | Tonomura et al. |
| 2011/0215344 A1 | 9/2011 | Dardy et al. |
| 2014/0060178 A1 | 3/2014 | Wong et al. |
| 2017/0146887 A1 | 5/2017 | Timurdogan et al. |
| 2017/0299811 A1 | 10/2017 | Wessels et al. |
| 2018/0373067 A1 | 12/2018 | Fujikata |
| 2021/0124233 A1 | 4/2021 | Liang et al. |

OTHER PUBLICATIONS

U.S. Appl. No. 16/697,704, "Non-Final Office Action", dated May 14, 2020, 6 pages.

U.S. Appl. No. 16/697,704, "Notice of Allowance", dated Feb. 22, 2021, 8 pages.

U.S. Appl. No. 16/697,704, "Notice of Allowance", dated Oct. 29, 2020, 7 pages.

Abel, "Electro-Optic Photonic Devices Based on Epitaxial Barium Titanate Thin Films on Silicon", Photonic. Universite Grenoble Alpes, Nov. 17, 2015, 1-243.

Gehl, et al., "Operation of High-Speed Silicon Photonic Micro-Disk Modulators at Cryogenic Temperatures", Optica, vol. 4, No. 3, Mar. 16, 2017, pp. 374-382.

PCT/US2020/023196, "International Search Report and Written Opinion", dated Jun. 19, 2020, 14 pages.

Timurdogan, et al., "Electric Field-Induced Second-Order Nonlinear Optical Effects in Silicon Waveguides", Nature Photonics, vol. 11, <www.nature.com/naturephonics>, Feb. 20, 2017, pp. 200-207.

U.S. Appl. No. 16/903,285, "Notice of Allowance", dated Oct. 15, 2021, 9 pages.

PCT/US2020/023196, "International Preliminary Report on Patentability", dated Sep. 30, 2021, 13 pages.

U.S. Appl. No. 16/903,285, "Non-Final Office Action", dated Jun. 29, 2021, 8 pages.

Vuong, et al., "Isotope Engineering of Van Der Waals Interactions in Hexagonal Boron Nitride", Nature Materials, vol. 17, Feb. 2018, pp. 152-158.

EP20773694.3, "Extended European Search Report", dated Oct. 20, 2022, 9 pages.

U.S. Appl. No. 17/673,696, "Notice of Allowance", dated Feb. 1, 2023, 9 pages.

ACTIVE PHOTONIC DEVICES INCORPORATING HIGH DIELECTRIC CONSTANT MATERIALS

CROSS-REFERENCES TO RELATED APPLICATIONS

This application is a continuation of U.S. patent application Ser. No. 16/697,704, filed Nov. 27, 2019, now U.S. Pat. No. 11,036,111, issued Jun. 15, 2021; which is a continuation of U.S. patent application Ser. No. 16/365,543, issued on Mar. 26, 2019, now U.S. Pat. No. 10,627,696, issued Apr. 21, 2020; which claims priority to U.S. Provisional Patent Application No. 62/819,765, filed on Mar. 18, 2019, the disclosures of which are hereby incorporated by reference in their entirety for all purposes.

BACKGROUND OF THE INVENTION

Electro-optic (EO) modulators and switches have been used in optical fields. Some EO modulators utilize free-carrier electro-refraction, free-carrier electro-absorption, or the DC Kerr effect to modify optical properties during operation, for example, to change the phase of light propagating through the EO modulator or switch. As an example, optical phase modulators can be used in integrated optics systems, waveguide structures, and integrated optoelectronics.

Despite the progress made in the field of EO modulators and switches, there is a need in the art for improved methods and systems related to EO modulators and switches.

SUMMARY OF THE INVENTION

Embodiments of the present invention generally relate to photonic devices. More particularly, embodiments of the present invention relate to active photonic devices utilized as components of optical modulators and optical switches. In a particular embodiment, active photonic devices including waveguide cladding materials characterized by high electro-optic coefficients are utilized to improve modulation and/or switching performance. Moreover, in another embodiment, active photonic devices including waveguide cladding materials characterized by high dielectric constants are utilized to improve modulation and/or switching performance. The present invention has applicability to a wide variety of photonic and opto-electronic devices.

According to an embodiment of the present invention, a waveguide structure is provided. The waveguide structure includes a substrate, a waveguide core coupled to the substrate and including a first material characterized by a first index of refraction and a first dielectric constant, and a waveguide cladding at least partially surrounding the waveguide core and including a second material characterized by a second index of refraction less than the first index of refraction and a second dielectric constant greater than the first dielectric constant.

In some embodiments, the first material comprises silicon, the first dielectric constant is 11.7, and the second dielectric constant is greater than 11.7. As examples, the second material can include $HfO_2$, $Ta_2O_5$, or $ZrO_2$. In an alternative embodiment, the waveguide structure further includes a set of electrodes operable to establish an electric field across the waveguide cladding and the waveguide core. A voltage drop across the waveguide core is greater than a voltage drop across the waveguide cladding. Furthermore, in some embodiments, the waveguide structure also includes a second cladding layer coupled to the waveguide cladding. The first material is characterized by a first electro-optic coefficient, the second material is characterized by a second electro-optic coefficient greater than the first electro-optic coefficient, and the second cladding layer includes a third material characterized by a third electro-optic coefficient greater than the first electro-optic coefficient.

According to another embodiment of the present invention, an optical switch structure is provided. The optical switch structure includes a substrate, a first electrical contact, and a first material having a first conductivity type electrically connected to the first electrical contact. The optical switch structure also includes a second material having a second conductivity type coupled to the first material and a second electrical contact electrically connected to the second material. The optical switch structure further includes a waveguide structure disposed between the first electrical contact and the second electrical contact. The waveguide structure includes a waveguide core coupled to the substrate and including a first material characterized by a first index of refraction and a first electro-optic coefficient (e.g., having a value of approximately zero) and a waveguide cladding at least partially surrounding the waveguide core and including a second material characterized by a second index of refraction less than the first index of refraction and a second electro-optic coefficient greater than the first electro-optic coefficient.

In an embodiment, the waveguide core supports a guided mode characterized by an optical power. A majority of the optical power is contained in the waveguide core. The waveguide core can include silicon or can consist of silicon. In some embodiments, the waveguide core can support a TE polarization mode.

According to a specific embodiment of the present invention, a waveguide structure is provided. The waveguide structure includes a substrate and a waveguide core coupled to the substrate and including a first material characterized by a first index of refraction and a first electro-optic coefficient. The waveguide structure also includes a first cladding layer at least partially surrounding the waveguide core and including a second material characterized by a second index of refraction less than the first index of refraction and a second electro-optic coefficient greater than the first electro-optic coefficient and a second cladding layer coupled to the first cladding layer. The waveguide core can include silicon, the first cladding layer comprises tantalum oxide, and the second cladding layer comprises silicon dioxide.

The second cladding layer can include a third material characterized by a third electro-optic coefficient greater than the first electro-optic coefficient. The second electro-optic coefficient and the third electro-optic coefficient can be greater than or equal to an electro-optic coefficient for silicon. In some embodiments, the third electro-optic coefficient is less than the second electro-optic coefficient. As an example, the waveguide cladding can include 200 nm of the second material proximal to the waveguide core and 2 μm of the third material distal to the waveguide core. The second material, for example, tantalum oxide ($Ta_2O_5$), can be characterized by a $\chi^{(3)}$ value greater than $2.2 \times 10^{-18}$ $m^2/W$. In other embodiments, the second material, for example, lead zirconate titanate (PZT) or barium titanate ($BaTiO_3$), can be characterized by a $\chi^{(2)}$ value greater than zero, greater than 10 pm/V, or greater than 100 pm/V. The waveguide structure can include a Mach-Zehnder interferometer or a ring resonator.

According to another specific embodiment of the present invention, an optical switch structure is provided. The optical switch structure includes a substrate, a waveguide structure coupled to the substrate, and a set of electrodes positioned adjacent the waveguide structure. The set of electrodes are configured to establish an applied electric field having a component oriented along a lateral direction. The waveguide structure includes a waveguide core configured to support a guided mode polarized along the lateral direction and propagating along a longitudinal direction orthogonal to the lateral direction and including a first material characterized by a first index of refraction and a first electro-optic coefficient. The waveguide core can include silicon or consist of silicon. The guided mode can include a TE polarization mode. The waveguide structure also includes a waveguide cladding at least partially surrounding the waveguide core and including a second material characterized by a second index of refraction less than the first index of refraction and a second electro-optic coefficient tensor having a maximum value aligned with the lateral direction.

In an embodiment, the first electro-optic coefficient and the second electro-optic coefficient are the Kerr coefficient $\chi^{(3)}$. In another embodiment, the first electro-optic coefficient and the second electro-optic coefficient are the Pockels coefficient $\chi^{(2)}$.

According to a particular embodiment of the present invention, an optical switch structure is provided. The optical switch structure includes at least one optical input port and at least one optical output port. The at least one optical output port can include a first optical output port and a second optical output port. The optical switch structure also includes an optical waveguide structure including a waveguide core (e.g., silicon) and a waveguide cladding. The optical waveguide structure is optically coupled to the at least one optical input port. The waveguide core includes a first material characterized by a first index of refraction and a first electro-optic coefficient and the waveguide cladding includes a second material characterized by a second index of refraction less than the first index of refraction and a second electro-optic coefficient greater than the first electro-optic coefficient.

In an embodiment, the first electro-optic coefficient and the second electro-optic coefficient are the Kerr coefficient $\chi^{(3)}$. In another embodiment, the first electro-optic coefficient and the second electro-optic coefficient are the Pockels coefficient $\chi^{(2)}$. The waveguide core can support a guided mode characterized by an optical power, with the majority of the optical power being contained in the waveguide core.

In a particular embodiment, the optical switch structure further includes a first electric contact and a second electrical contact configured to generate an applied electric field produced in the optical waveguide structure that is characterized by a direction and the waveguide cladding is characterized by an electro-optic coefficient tensor having a maximum value aligned along the direction. The guided mode supported by the waveguide core can have a direction of polarization aligned with the direction. As an example, the waveguide cladding can be characterized by a DC Kerr effect and a Pockels effect having a same sign. For instance, the DC Kerr effect can be positive and the Pockels effect can be positive. The waveguide cladding can include a first material type, with a majority of polarization domains being aligned with a positive z-direction, and a direction of the applied electric field can be negative.

In another embodiment, the waveguide cladding includes a first material type, a majority of polarization domains are aligned with a negative z-direction, and a direction of the applied electric field is positive. In yet another embodiment, the waveguide cladding includes a second material type, a majority of polarization domains are aligned with a positive z-direction, and a direction of the applied electric field is positive. In a particular embodiment, the waveguide cladding includes a second material type, a majority of polarization domains are aligned with a negative z-direction, and a direction of the applied electric field is negative.

According to another particular embodiment of the present invention, an integrated optical system is provided. The integrated optical system includes a cryostat and a device disposed in the cryostat. The device includes an electro-optic switch including at least one input port, a first beam splitter, and a Mach-Zehnder interferometer coupled to the first beam splitter. The Mach-Zehnder interferometer includes a phase adjustment region including a waveguide core characterized by a first dielectric constant and a waveguide cladding at least partially surrounding the waveguide core and including a second material characterized by a second dielectric constant greater than the first dielectric constant. The device also includes a second beam splitter coupled to the Mach-Zehnder interferometer and a set of output ports coupled to the second beam splitter.

The waveguide core can include silicon, the first dielectric constant can be 11.7, and the second dielectric constant can be greater than 11.7. As an example, the second material can include $HfO_2$, $Ta_2O_5$, or $ZrO_2$. In an embodiment, the integrated optical system further includes a set of electrodes operable to establish an electric field across the waveguide cladding and the waveguide core. A voltage drop across the waveguide core is greater than a voltage drop across the waveguide cladding. In another embodiment, the integrated optical system further includes a second cladding layer coupled to the waveguide cladding. In this embodiment, the waveguide core is characterized by a first electro-optic coefficient, the second material is characterized by a second electro-optic coefficient greater than the first electro-optic coefficient, and the second cladding layer includes a third material characterized by a third electro-optic coefficient greater than the first electro-optic coefficient.

According to another embodiment of the present invention, an optical switch structure is provided. The optical switch structure includes a substrate, a waveguide structure coupled to the substrate, and a set of electrodes positioned adjacent the waveguide structure. The set of electrodes are configured to establish an applied electric field having a component oriented along a lateral direction. The waveguide structure includes a waveguide core configured to support a guided mode propagating along a longitudinal direction orthogonal to the lateral direction and including a first material characterized by a first index of refraction and a first electro-optic coefficient and a waveguide cladding at least partially surrounding the waveguide core and including a second material characterized by a second index of refraction less than the first index of refraction and a second electro-optic coefficient. The waveguide cladding is characterized by a DC Kerr coefficient $\chi^{(3)}$ and a Pockels coefficient $\chi^{(2)}$ that are both associated with a positive change in index of refraction.

Numerous benefits are achieved by way of the present disclosure over conventional techniques. For example, embodiments of the present invention provide methods and systems that can utilize a reduced applied bias to achieve a given electric field in a waveguide core, thereby reducing power consumption and increasing efficiency. Moreover, embodiments of the present invention enable larger changes in effective index of refraction than using conventional techniques. As a result, device length can be decreased, which, in turn, reduces optical losses and saves space. These and other embodiments of the disclosure along with many of its advantages and features are described in more detail in conjunction with the text below and attached figures.

DETAILED DESCRIPTION OF THE INVENTION

Embodiments of the present invention relate to optical systems. More particularly, embodiments of the present invention utilize high dielectric constant materials (i.e., high-κ materials) in optical modulators and switches to reduce power consumption during operation. Merely by way of example, embodiments of the present invention are provided in the context of integrated optical systems that include active optical devices, but the invention is not limited to this example and has wide applicability to a variety of optical and optoelectronic systems.

According to some embodiments, the active photonic devices described herein utilize electro-optic effects, such as free carrier induced refractive index variation in semiconductors, the Pockels effect, and/or the DC Kerr effect to implement modulation and/or switching of optical signals. Thus, embodiments of the present invention are applicable to both modulators, in which the transmitted light is modulated either ON or OFF, or light is modulated with a partial change in transmission percentage, as well as optical switches, in which the transmitted light is output on a first output (e.g., waveguide) or a second output (e.g., waveguide) or an optical switch with more than two outputs, as well as more than one input. Thus, embodiments of the present invention are applicable to a variety of designs including an M(input)×N(output) systems that utilize the methods, devices, and techniques discussed herein.

Figure 1:
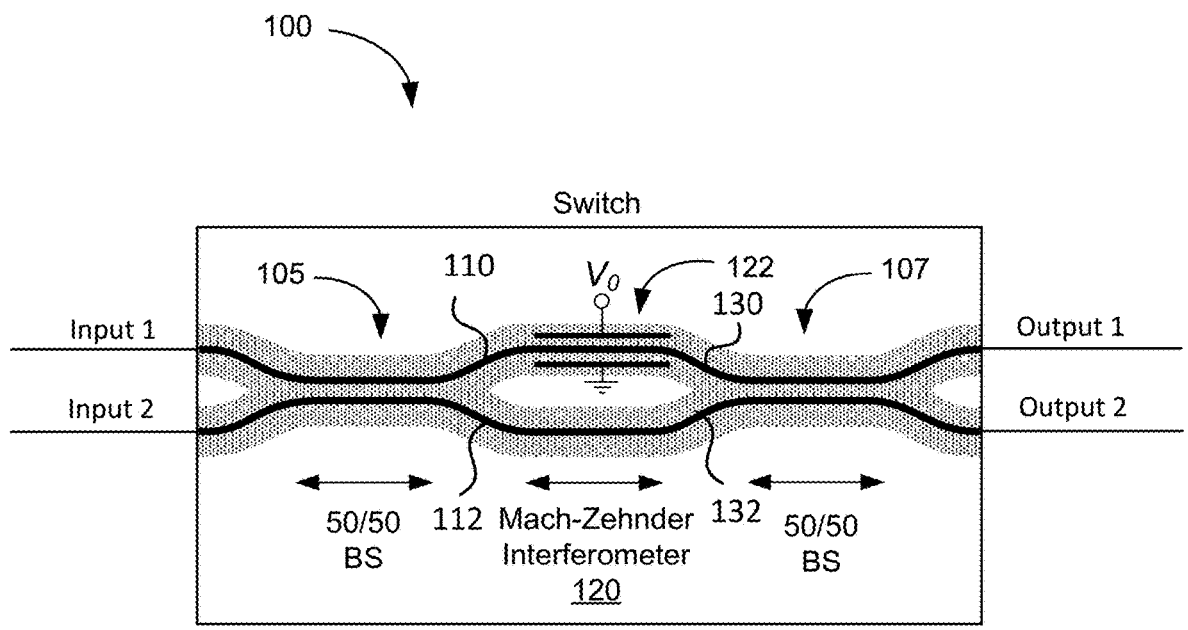
FIG. 1 is a simplified schematic diagram illustrating an optical switch according to an embodiment of the present invention.

FIG. 1 is a simplified schematic diagram illustrating an optical switch according to an embodiment of the present invention. Referring to FIG. 1, switch 100 includes two inputs: Input 1 and Input 2 as well as two outputs: Output 1 and Output 2. As an example, the inputs and outputs of switch 100 can be implemented as optical waveguides operable to support single mode or multimode optical beams. As an example, switch 100 can be implemented as a Mach-Zehnder interferometer integrated with a set of 50/50 beam splitters 105 and 107, respectively. As illustrated in FIG. 1, Input 1 and Input 2 are optically coupled to a first 50/50 beam splitter 105, also referred to as a directional coupler, which receives light from the Input 1 or Input 2 and, through evanescent coupling in the 50/50 beam splitter, directs 50% of the input light from Input 1 into waveguide 110 and 50% of the input light from Input 1 into waveguide 112. Concurrently, first 50/50 beam splitter 105 directs 50% of the input light from Input 2 into waveguide 110 and 50% of the input light from Input 2 into waveguide 112. Considering only input light from Input 1, the input light is split evenly between waveguides 110 and 112.

Mach-Zehnder interferometer 120 includes phase adjustment section 122. Voltage $V_0$ can be applied across the waveguide in phase adjustment section 122 such that it can have an index of refraction in phase adjustment section 122 that is controllably varied. Because light in waveguides 110 and 112 is in-phase after propagation through the first 50/50 beam splitter 105, phase adjustment in phase adjustment section 122 can introduce a predetermined phase difference between the light propagating in waveguides 130 and 132. As will be evident to one of skill in the art, the phase relationship between the light propagating in waveguides 130 and 132 can result in output light being present at Output 1 (e.g., light beams are in-phase) or Output 2 (e.g., light beams are out of phase), thereby providing switch functionality as light is directed to Output 1 or Output 2 as a function of the voltage $V_0$ applied at the phase adjustments section 122. Although a single active arm is illustrated in FIG. 1, it will be appreciated that both arms of the Mach-Zehnder interferometer can include phase adjustment sections.

As illustrated in FIG. 1, electro-optic switch technologies, in comparison to all-optical switch technologies, utilize the application of the electrical bias (e.g., $V_0$ in FIG. 1) across the active region of the switch to produce optical variation. The electric field and/or current that results from application of this voltage bias results in changes in one or more optical properties of the active region, such as the index of refraction or absorbance. In addition to the power dissipated by current flow (in the cases where a current results from the application of the bias voltage), energy is dissipated by the creation of the electric field, which has an energy density of $E^2\kappa/8\pi$ (cgs units), where E is the electric field and $\kappa$ is the dielectric constant.

Although a Mach-Zehnder interferometer implementation is illustrated in FIG. 1, embodiments of the present invention are not limited to this particular switch architecture and other phase adjustment devices are included within the scope of the present invention, including ring resonator designs, Mach-Zehnder modulators, generalized Mach-Zehnder modulators, and the like. One of ordinary skill in the art would recognize many variations, modifications, and alternatives.

The inventors have determined that because the energy density is higher in regions with a high dielectric constant, incorporation of high-$\kappa$ materials into the electro-optic switch architecture can reduce the overall power consumption of the electro-optic switch because the energy density is proportional to the square of the electric field which, in a multilayer device, is inversely proportional to the dielectric constant. The impact of the dielectric constant of the optical materials is illustrated with respect to FIG. 2.

Figure 2:
FIG. 2 is a simplified schematic diagram showing a top view of an active waveguide region according to an embodiment of the present invention.

FIG. 2 is a simplified schematic diagram showing a top view of an active waveguide region according to an embodiment of the present invention. In FIG. 2, metal electrodes 210 and 212 are positioned on either side of waveguide core 220, which is disposed between waveguide cladding regions 222 and 224. In this implementation, the waveguide core 220 is fabricated using silicon and the waveguide cladding regions 222 and 224 are fabricated using silicon dioxide. The dielectric constants of the materials are represented by the $\kappa$ values of 11.7 for Si and 3.9 for $SiO_2$. The thickness of the layers (i.e., $d_{Si}$ and $d_{ox}$) as well as the electric field in each layer (i.e., $E_{Si}$ and $E_{ox}$) are also illustrated.

When an electric field is applied across the waveguide structure by the application of a voltage bias to the metal electrodes 210 and 212, the index of refraction in the waveguide core 220 and the waveguide cladding regions 222 and 224 is altered, through the DC Kerr effect. As described in relation to FIG. 1, incorporation of an active region (i.e., a phase adjustment section) as illustrated in FIG. 2 can be utilized to implement an electro-optic switch.

Because the displacement field perpendicular to the layers ($D=\kappa E$) must be continuous, $E_{Si}=(3.9/11.7) E_{ox}=E_{ox}/3$.

Thus, a significant portion of the electric field bias applied across the phase adjustment section device is dropped across the silicon dioxide cladding regions 222 and 224, which have low-$\kappa$ values in comparison to the silicon waveguide core, thereby failing to produce the desired index of refraction change in the silicon waveguide core as the bias is dropped across the low-$\kappa$ silicon dioxide layers. Given typical values for the waveguide layers designed to operate at 1.55 μm of $d_{Si}=0.5$ μm and $d_{ox}=0.5$ μm, which is approximately the minimum distance suitable for avoiding optical absorption by the metal electrodes, the potential drop across the silicon layer for an applied voltage bias of $V_0$ is only $V_0/7$. Thus, 6/7 of the applied voltage bias is dropped across the silicon oxide layers.

The capacitance of the device schematically illustrated in FIG. 2 per unit area is $C/A=1.67/4\pi d$, in the case where $d=d_{ox}=d_{Si}$ and the layer capacitances are added in series using cgs units. If the $SiO_2$ is replaced with a high-K dielectric the power consumption during operation is reduced significantly. In an embodiment, hafnium dioxide ($HfO_2$) is utilized in place of the silicon dioxide cladding layers. Assuming a typical dielectric constant for $HfO_2$ of 39, the potential drop across the silicon waveguide core becomes $5V/8$ because, $E_{Si}=(39/11.7) E_{ox}=10E_{ox}/3$.

The capacitance/area becomes $C/A=7.35/4\pi d$. Thus, replacing the silicon dioxide cladding layers with hafnium dioxide cladding layers enables embodiments of the present invention to lower the applied bias $V_0$ by a factor of $(5/8)/(1/7)=35/8$ while maintaining the same electric field in the silicon waveguide core, thereby achieving the same switching effect. Power reductions of this sort are of particular benefit to cryogenic electro-optic switches due to the difficulty in creating high voltage drivers that operate at low temperatures.

Because the energy per unit area required to charge the capacitance is equal to $0.5\ CV^2/A$, replacing the silicon dioxide cladding layers with hafnium dioxide cladding layers reduces the required switching energy by a factor of $(1.67/7.35)*(35/8)^2=4.4$. Thus, embodiments of the present invention enable substantial energy savings over conventional designs. One of skill in the art will appreciate that the model discussed in relation to FIG. 2 is utilized merely to demonstrate the impact of utilizing high-$\kappa$ dielectric materials in active devices since actual device geometries will not typically achieve benefits associated with the schematic system illustrated in FIG. 2. There will, however, still be significant advantages for typical device designs, including both carrier and Kerr based switches, because the high-$\kappa$ dielectric can be used to force higher electric fields in the lower $\kappa$ active area of the device while reducing or minimizing the overall required energy.

Although the discussion in relation to FIG. 2 has been provided in relation to the voltage and electric field being applied in the plane of the figure, this is not required by the present invention and other embodiments that are implemented in a "vertical" design are included within the scope of the present invention. Accordingly, the various materials can be formed using epitaxial growth, deposition, layer transfer, or the like to fabricate a structure in which the electric field is directed from upper layers of the structure to bottom layers or vice versa. One of ordinary skill in the art would recognize many variations, modifications, and alternatives.

Figure 3:
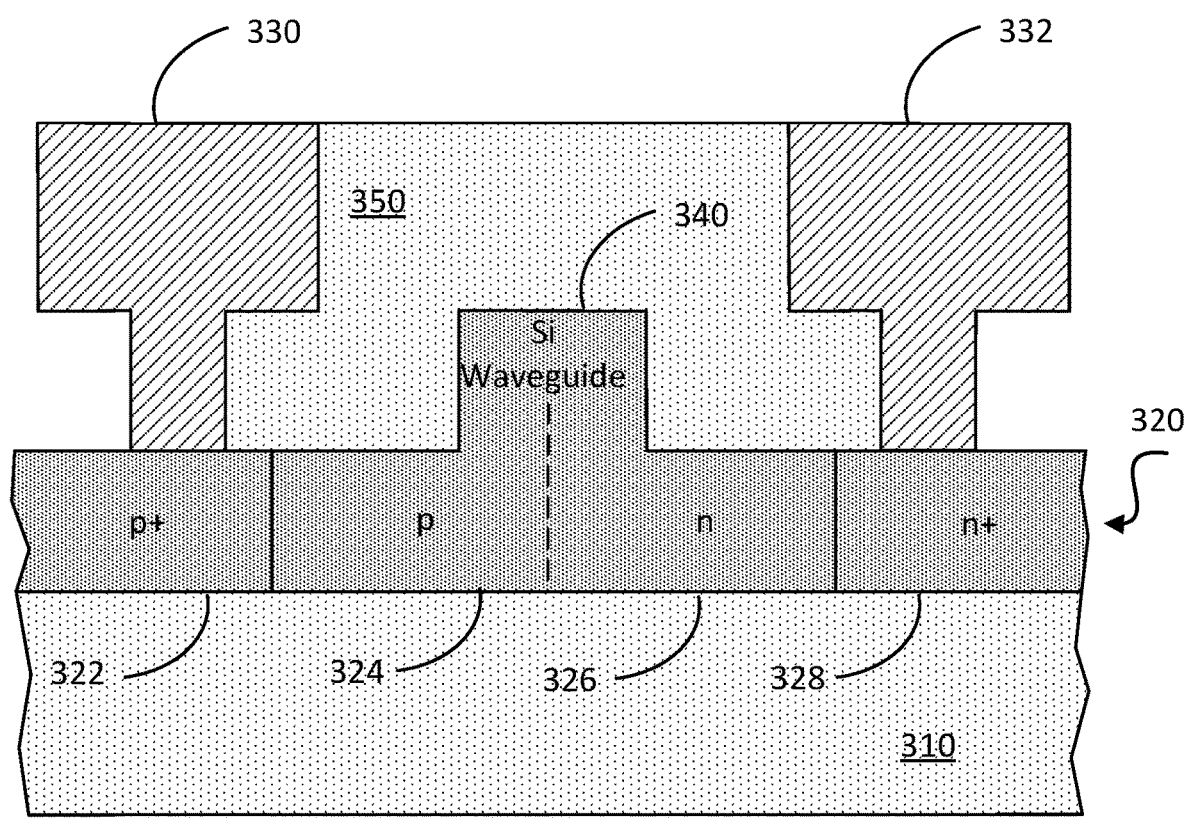
FIG. 3 is a simplified schematic diagram illustrating a p-n diode waveguide structure incorporating high-K materials according to an embodiment of the present invention.

FIG. 3 is a simplified schematic diagram illustrating a p-n diode waveguide structure incorporating high-$\kappa$ materials according to an embodiment of the present invention. Referring to FIG. 3, the cross-section of the p-n diode waveguide structure includes an illustration of substrate 310, which supports waveguide layer 320, which includes p+ contact region 322, p-type region 324, n-type region 326, and n+ contact region 328. In some embodiments, the substrate 310 is the buried oxide (BOX) layer of a silicon-on-insulator (SOI) structure, although this is not required by the present invention. Metal contacts 330 and 332 are provided to enable application of a voltage bias across the silicon waveguide core 340. Although in the embodiment illustrated in FIG. 3, a silicon waveguide core 340 is utilized, embodiments of the present invention are not limited to silicon for the waveguide core material and other materials including silicon nitride-based materials, silicon-germanium-based materials, or combinations thereof are included within the scope of the present invention.

Cladding material 350 disposed on either side of the silicon waveguide core 340 is fabricated using a high-κ material, for example, hafnium oxide ($HfO_2$). In some embodiments, a single transverse mode silicon waveguide structure is utilized with the width of the waveguide core 340 being in the sub-micron to micron range. In other embodiments, multimode waveguide structures are utilized with a wider waveguide core that supports two or more transverse modes. One of ordinary skill in the art would recognize many variations, modifications, and alternatives.

Characteristics of the cladding include the index of refraction (n), optical loss (the imaginary part of the index of refraction), and the dielectric constant (κ). The index of refraction can be considered as the square root of the high frequency (i.e., optical frequencies) dielectric constant whereas the dielectric constant κ can be considered as the low frequency (i.e. up to, for example, GHz frequencies) dielectric constant. Hafnium oxide is suitable for use in embodiments of the present invention since it is characterized by a high κ, has a wide bandgap, has an index of refraction of approximately n=2.0 (e.g., in the visible and near infrared), thereby providing a lower index of refraction than the silicon waveguide core, and exhibits low absorption at infrared wavelengths. Because the optical mode is present not only in the waveguide, but in the cladding as determined by the mode profile, low absorption by the cladding at the operating wavelength is utilized in some embodiments to provide low optical loss for the optical mode propagating in the waveguide.

In order to vary the index of refraction in the waveguide core, a voltage bias is applied using metal contacts 330 and 332, also referred to as electrodes. As an example, the p-n junction can be placed under reverse bias, generating a depletion region at the p-n junction interface. Thus, application of the reverse voltage bias will result in generation of an electric field in the waveguide core as well as in the cladding regions as discussed in relation to FIG. 2. As discussed above, the incorporation of the high-κ cladding material will result in an increased percentage of the applied bias being dropped across the waveguide core, thereby either increasing the index of refraction change at a given voltage bias or providing a given index of refraction change at a lower voltage bias.

Although a reverse biased junction is utilized in some embodiments, forward biasing of the p-n junction and the resulting current injection that will be produced can also be utilized to achieve variation of the complex index of refraction in the waveguide. As will be evident to one of skill in the art, increasing the free carrier concentration will decrease the real part of the index of refraction and increase the imaginary part (i.e., the imaginary part being proportional to the absorption). Introducing an electric field will increase the index of refraction through the DC Kerr effect. Thus, forward bias operation is utilized in some embodiments. Operation using forward bias can be used to change the index via a current, which can result in a level of power consumption. It will be appreciated that in the case of forward bias operation, rather than increasing or maximizing the electric field in the active region, a current is injected that that flows at a low bias, thereby utilizing a structure with a reduced or minimized resistance. Moreover, it will be appreciated that devices provided according to embodiments of the present invention may not simultaneously utilize the DC Kerr effect (e.g., through application of an electric field) and free-carrier electrorefraction (e.g., by introducing carriers) because these effects generally oppose each other. One of ordinary skill in the art would recognize many variations, modifications, and alternatives.

The use of the high-κ material for the cladding will, for a given change index of refraction, enable the use of lower bias voltages and consume less energy than conventional designs in which the cladding regions surrounding the waveguide core do not have a higher dielectric constant. As a result, when utilized in a switch or modulator, the desired phase adjustment, for example, to introduce a π phase shift between the arms of an interferometer, can be achieved at lower applied voltage and, as a result, can consume less energy. Thus, embodiments of the present invention enable the incorporation of high-κ material to reduce the energy consumption associated with electro-optic switches. As described herein, embodiments of the present invention enable cryogenic operation By incorporating high-κ cladding materials, operation of switches at energies below 10 pJ is enabled; for example, operation at energies in the range of 100 fJ to 10 pJ are possible. In comparison, conventional dielectric materials, such as silicon dioxide, may not be able to achieve operation at these low energies as a result of the small fraction of the voltage bias that is dropped across the waveguide core. Thus, embodiments of the present invention enable operation of devices that enjoy the benefits of resonant structures, but with reduced manufacturing tolerances. As an example, embodiments of the present invention can provide performance comparable to that achieved using some form of resonant enhancement (for example, a ring or photonic crystal). However, these performance benefits are achieved with a reduction in drawbacks associated with resonant enhancement, for example, the need for very tight manufacturing tolerances to achieve uniformity/reproducibility in performance.

In integrated electro-optics implementations in which multiple switches are operated as components of a larger system, local temperature increases as a result of energy deposition in the switch components can result in the operation of the switch, as well as neighboring switches and components that fall outside system specifications. Thus, both temporal as well as spatial variations in temperature across an integrated optics device can be prevented using embodiments of the present invention. As an example, in the Mach-Zehnder interferometer illustrated in FIG. 1, increase in temperature of the phase adjustment section can result in an increase in the index of refraction, resulting in unbalancing of the arms of the interferometers. Thus, the low energy operation provided by embodiments of the present invention enables the development and production of integrated optics systems that are not achievable using conventional techniques. This is particularly true for operation at low temperatures, for example, at liquid helium temperatures.

Although a silicon waveguide core and hafnium oxide cladding is utilized in the embodiment illustrated in FIG. 3, other materials can be utilized according to embodiments of the present invention. For example, in addition to silicon, other materials including SiN, Ge, SiGe, and various polymers can be utilized for the waveguide core. Moreover, in addition to hafnium dioxide, other materials including tantalum oxide ($Ta_2O_5$), zirconium oxide ($ZrO_2$), titanium dioxide ($TiO_2$), other refractory metal oxides, combinations thereof, or the like can be utilized for the waveguide cladding.

Figure 4:
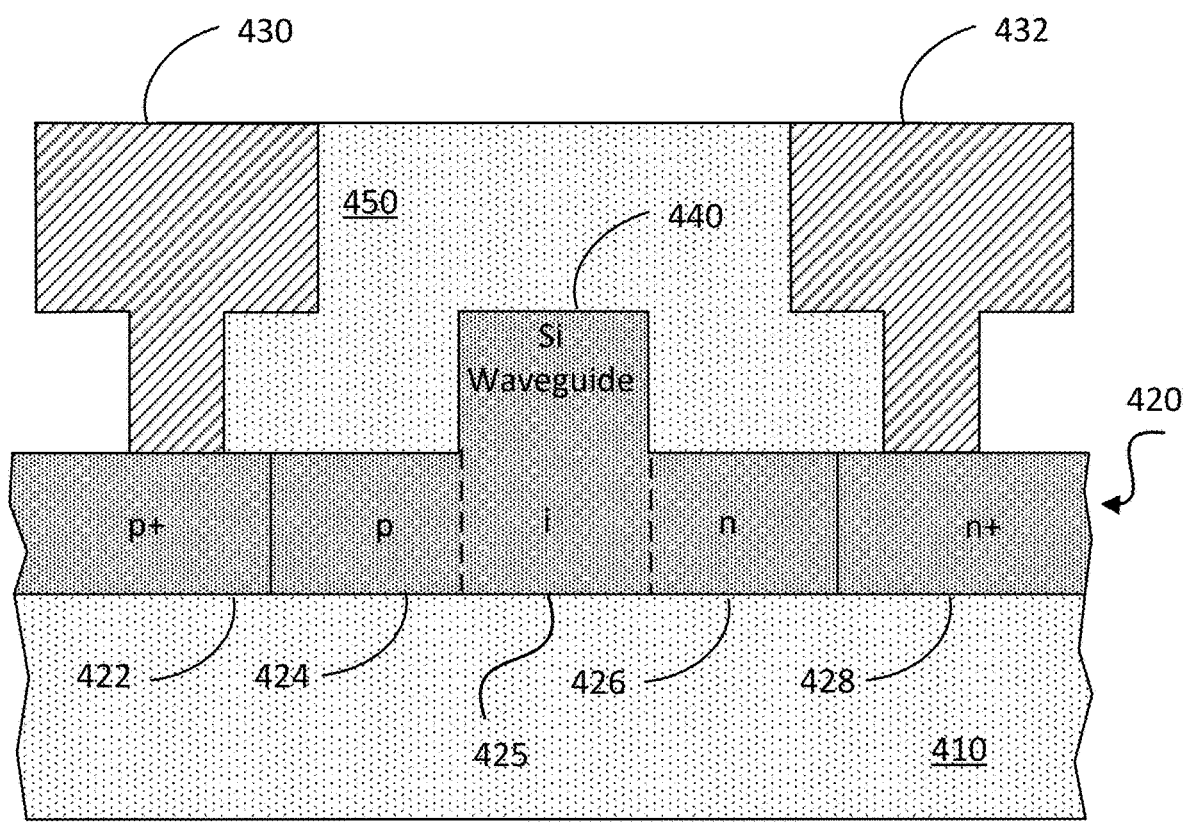
FIG. 4 is a simplified schematic diagram illustrating a p-i-n diode waveguide structure incorporating high-K materials according to an embodiment of the present invention.

FIG. 4 is a simplified schematic diagram illustrating a p-i-n diode waveguide structure incorporating high-κ materials according to an embodiment of the present invention. The p-i-n diode waveguide structure illustrated in FIG. 4 shares similarities with the p-n diode waveguide structure illustrated in FIG. 3 and the discussion provided in relation to FIG. 3 is applicable to FIG. 4 as appropriate.

Referring to FIG. 4, the cross-section of the p-i-n diode waveguide structure includes an illustration of substrate 410, which supports waveguide layer 420, which includes p+ contact region 422, p-type region 424, intrinsic region 425, n-type region 426, and n+ contact region 428. In some embodiments, the substrate 410 is the buried oxide (BOX) layer of a silicon-on-insulator (SOI) structure, although this is not required by the present invention. Metal contacts 430 and 432 are provided to enable application of a voltage bias across the silicon waveguide core 440. Cladding material 450 disposed on either side of the silicon waveguide core 440 is fabricated using a high-κ material, for example, hafnium oxide ($HfO_2$). Hafnium oxide is suitable for use in embodiments of the present invention since it is characterized by a high κ, has a wide bandgap, has an index of refraction of approximately n=2.0, thereby providing a lower index of refraction than the silicon waveguide core 440, and exhibits low absorption at infrared wavelengths. Because the optical mode is present not only in the waveguide, but in the cladding as determined by the mode profile, low absorption by the cladding at the operating wavelength is utilized in some embodiments to provide low optical loss for the optical mode propagating in the waveguide.

In order to vary the index of refraction in the waveguide core, a voltage bias is applied using metal contacts 430 and 432, also referred to as electrodes. As an example, the p-i-n junction can be placed under reverse bias, generating a depletion region in the intrinsic region 425. Thus, application of the reverse voltage bias will result in generation of an electric field in the waveguide core as well as in the cladding regions as discussed in relation to FIG. 2. As discussed above, the incorporation of the high-κ cladding material will result in an increased percentage of the voltage bias being dropped across the waveguide core, thereby either increasing the index of refraction change at a given voltage bias or providing a given index of refraction change at a lower voltage bias.

Although a silicon waveguide core and hafnium oxide cladding are utilized in the embodiment illustrated in FIG. 4, other materials can be utilized according to embodiments of the present invention. For example, in addition to silicon, other materials including SiN, Ge, SiGe, and various polymers can be utilized for the waveguide core. Moreover, in addition to hafnium dioxide, other materials including tantalum oxide ($Ta_2O_5$), zirconium oxide ($ZrO_2$), titanium dioxide ($TiO_2$), other refractory metal oxides, combinations thereof, or the like can be utilized for the waveguide cladding.

Figure 5:
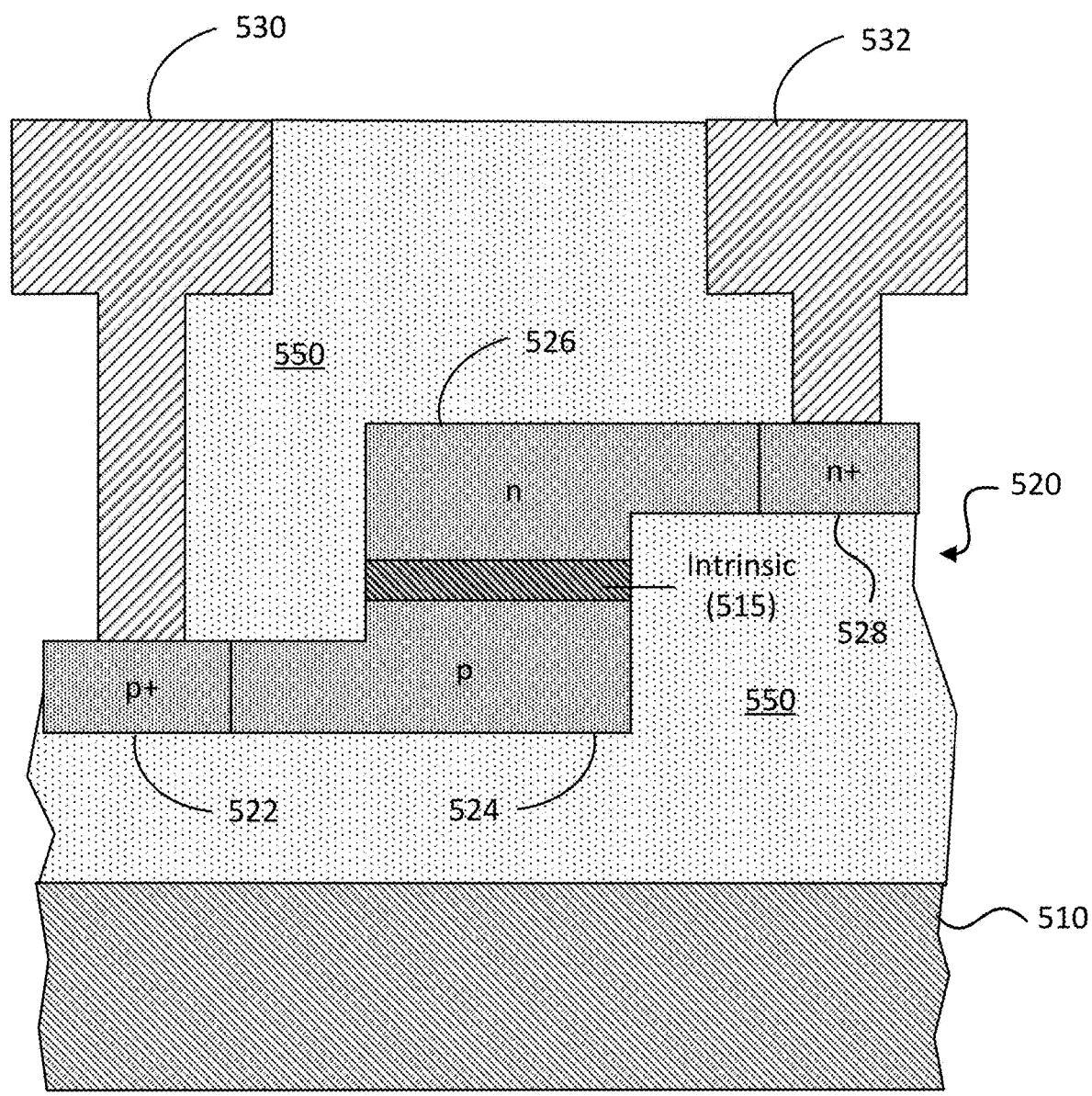
FIG. 5 is a simplified schematic diagram illustrating a vertical pin waveguide structure incorporating high-K materials according to an embodiment of the present invention

FIG. 5 is a simplified schematic diagram illustrating a vertical pin waveguide structure incorporating high-κ materials according to an embodiment of the present invention. The vertical pin waveguide structure illustrated in FIG. 5 shares similarities with the p-n diode waveguide structure illustrated in FIG. 3 and the discussion provided in relation to FIG. 3 is applicable to FIG. 5 as appropriate.

Referring to FIG. 5, the cross-section of the vertical pin waveguide structure includes an illustration of substrate 510, which supports waveguide region 520, which includes p+ contact region 522, p-type region 524, n-type region 526, and n+ contact region 528. The optical waveguide is defined by the p-type region 524, intrinsic silicon layer 515, and the n-type region 526. In some embodiments, the substrate 510 is the buried oxide (BOX) layer of a silicon-on-insulator (SOI) structure, although this is not required by the present invention. Metal contacts 530 and 532 are provided to enable application of a voltage bias across the vertical pin formed by the p-type region 524, the intrinsic layer 515, and the n-type region 526. Cladding material 550 is disposed on either side of the vertical pin and is fabricated using a high-κ material, for example, hafnium oxide ($HfO_2$).

In the vertical pin waveguide structure illustrated in FIG. 5, a guided mode is supported with a peak amplitude that is generally aligned with the intrinsic layer 515. The intrinsic layer 515 can be fabricated using a suitable undoped or low-doped semiconductor, for example, silicon if p-type region 524 and n-type region 526 are silicon. In some embodiments, the thickness of the intrinsic layer 515 ranges from about 0 nm to about 100 nm, for example, 30 nm.

In some embodiments, biasing of the metal contacts 530 and 532 can result in carrier accumulation at the interfaces between the p-type region 524 and the insulator layer 515 and the n-type region 526 and the insulator layer 515. The carrier accumulation will result in the generation of an electric field in the optically active region as well as potentially in the cladding regions surrounding the optically active region. The use of the high-κ material for the cladding material 550 will, for a given change index of refraction, enable the use of lower bias voltages and consume less energy than conventional designs in which the cladding regions surrounding the waveguide core do not incorporate high-κ materials.

Figure 6:
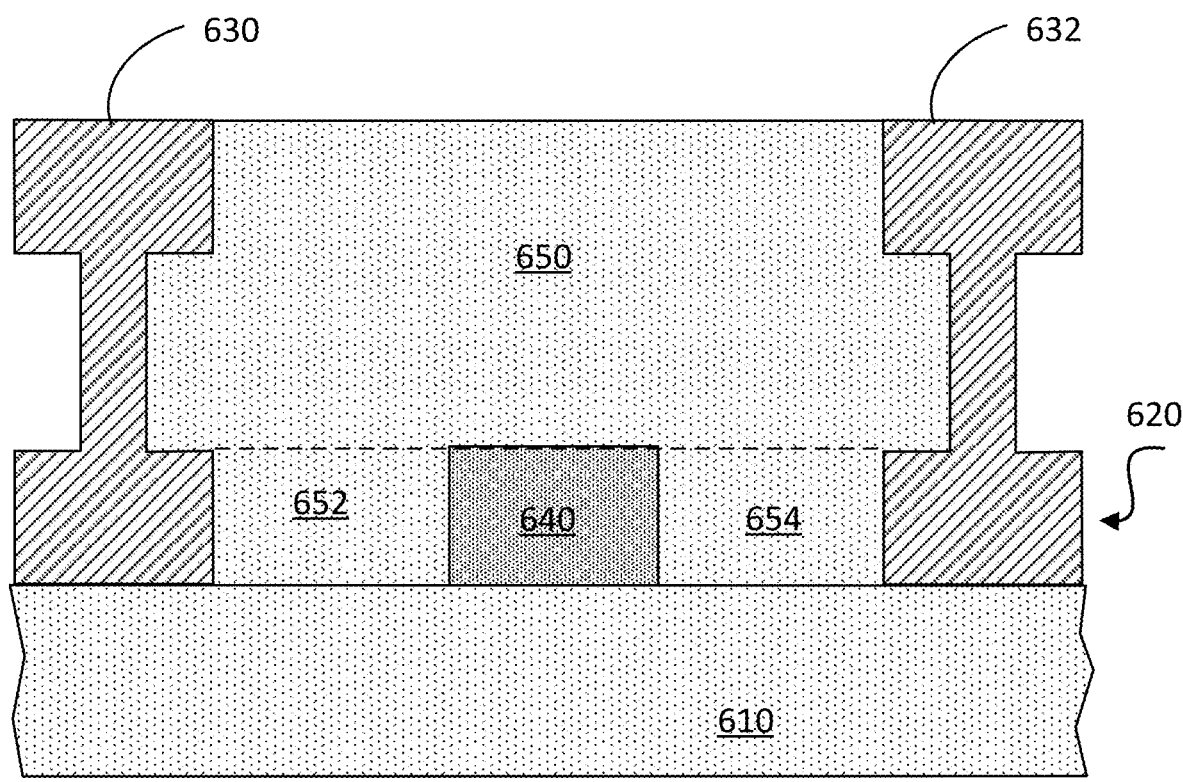
FIG. 6 is a simplified schematic diagram illustrating a dielectric-waveguide-dielectric structure incorporating high-K materials according to an embodiment of the present invention.

FIG. 6 is a simplified schematic diagram illustrating a dielectric-waveguide-dielectric structure incorporating high-κ materials according to an embodiment of the present invention. The dielectric-waveguide-dielectric structure illustrated in FIG. 6 shares similarities with the p-n diode waveguide structure illustrated in FIG. 3 and the discussion provided in relation to FIG. 3 is applicable to FIG. 6 as appropriate.

Referring to FIG. 6, the cross-section of the dielectric-waveguide-dielectric structure includes an illustration of substrate 610, which supports waveguide layer 620, which includes waveguide core 640. In some embodiments, the substrate 610 is the buried oxide (BOX) layer of a silicon-on-insulator (SOI) structure, although this is not required by the present invention. Metal contacts 630 and 632 are provided to enable application of a voltage bias across the silicon waveguide core 640. Cladding material 650 disposed on either side of the silicon waveguide core 640 is fabricated using a high-κ material, for example, hafnium oxide ($HfO_2$).

In order to vary the index of refraction in the waveguide core 640, a voltage bias is applied using metal contacts 630 and 632, also referred to as electrodes. Since there is no current conduction path in the dielectric-waveguide-dielectric structure, the bias applied to the electrodes will be dropped across the dielectric region 652 between metal contact 630 and the waveguide core 640, the waveguide core 640, and the dielectric region 654 between the waveguide core 640 and metal contact 632. In addition to use of high-κ materials for the cladding material, dielectric region 652 and/or dielectric region 654 can also utilize high-κ materials. Moreover, substrate 610 can utilize high-κ material in some embodiments.

As discussed above, the incorporation of the high-κ cladding material will result in an increased percentage of the electric field being dropped across the waveguide core, thereby either increasing the index of refraction change at a given voltage bias or providing a given index of refraction change at a lower voltage bias.

It should be noted that a "vertical" implementation of the dielectric-waveguide-dielectric structure incorporating high-κ materials illustrated in FIG. 6 are included within the scope of the present invention. Dielectric region 652 and 654, as well as waveguide core 640 can be formed using epitaxial processes to form a vertical implementation that will share common elements with the embodiment illustrated in FIG. 6 and provide benefits of smaller device geometry as well as other benefits. One of ordinary skill in the art would recognize many variations, modifications, and alternatives.

According to some embodiments, the active photonic devices described herein utilize electro-optic effects, such as free carrier induced refractive index variation in semiconductors, the Pockels effect, and/or the DC Kerr effect to implement modulation and/or switching of optical signals. In conventional active photonic devices, although electro-optic materials can be utilized to form the waveguide core, materials characterized by small electro-optic coefficients, particularly materials having a small DC Kerr effect coefficient (i.e., the Kerr coefficient $\chi^{(3)}$) are utilized to form the waveguide cladding. In these conventional devices, the overlap between the applied electric field and the optical mode(s) is present in both the waveguide core and the waveguide cladding regions, resulting in inefficient modulation because the waveguide cladding utilizes materials with small electro-optic values, thereby resulting in minimal variation in the index of refraction as a function of the applied electric field in the waveguide cladding.

As described herein, some embodiments of the present invention provide active photonic devices that use electro-optic materials for both the waveguide core and the waveguide cladding. In terms of the waveguide structure, the active photonic devices utilize a first type of electro-optic material characterized by a first (e.g., high) index of refraction as the waveguide core and a second type of electro-optic material with a second (e.g., low) index of refraction as the waveguide cladding. Accordingly, the index changes for the waveguide structure result from contributions provided by both the core and cladding materials, thereby enhancing the optical modulation produced at a given applied electric field.

Although some embodiments of the present invention are discussed in relation to materials characterized by a large DC Kerr effect (which results from a large third order non-linear susceptibility, $\chi^{(3)}$), other embodiments utilize materials characterized by a high Pockels coefficient (which results from a large second order non-linear susceptibility, $\chi^{(3)}$). Thus, both of these electro-optical coefficients are included within the scope of the present invention. As described herein, in some embodiments, the DC Kerr effect is the dominant effect in achieving index of refraction change since, as described below, unstrained silicon has a Pockels coefficient equal to zero. Thus, the DC Kerr effect produced in the silicon waveguide portions of the structure can be enhanced by the Pockels effect produced in the cladding portions of the structure. In some conventional silicon photonics devices, the Pockels effect is utilized. In these devices, materials that have a high electro-optic effect have been utilized as internal layers in slot waveguide structures, but the use of cladding materials with a high electro-optic effect is generally discouraged because their typically low index of refraction compared to silicon results in a low waveguide confinement factor.

Figure 7A:
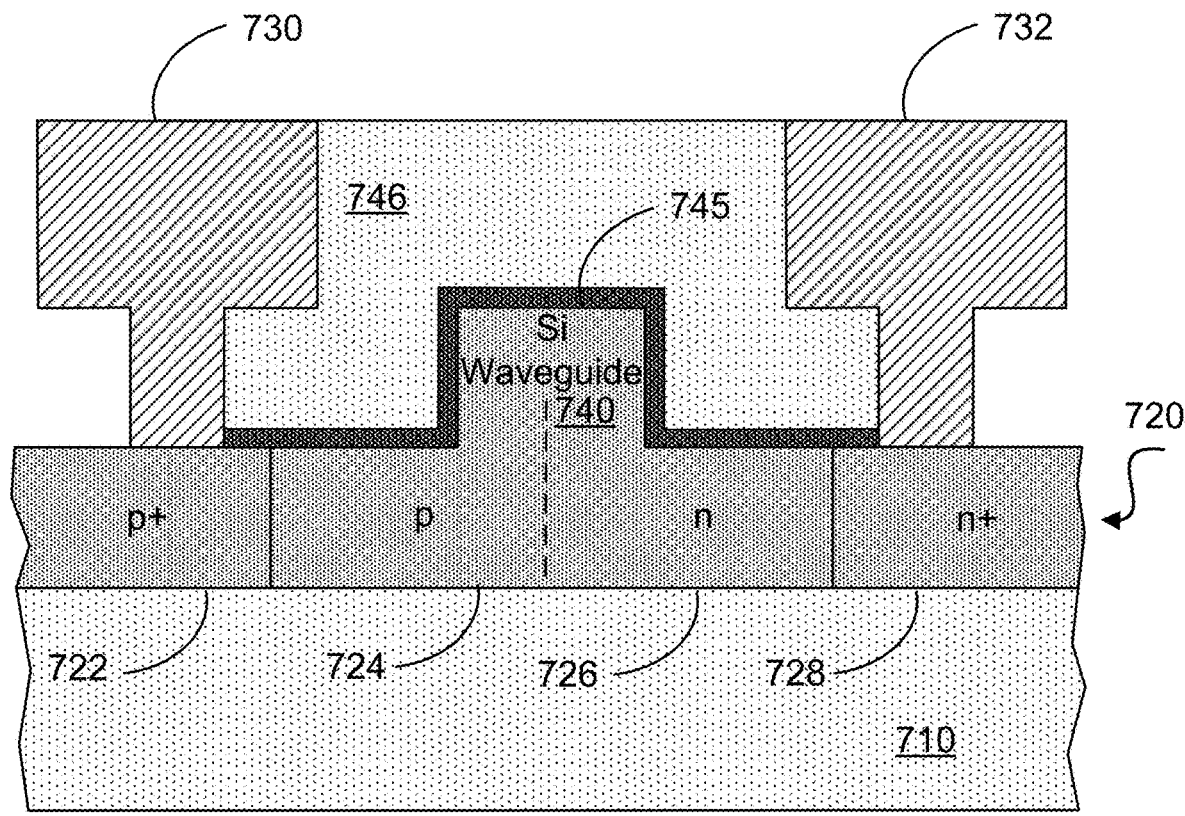
FIG. 7A is a simplified schematic diagram illustrating a p-n diode waveguide structure incorporating electro-optic cladding materials according to an embodiment of the present invention.

FIG. 7A is a simplified schematic diagram illustrating a p-n diode waveguide structure incorporating electro-optic cladding materials according to an embodiment of the present invention. Referring to FIG. 7A, the cross-section of the p-n diode waveguide structure includes an illustration of substrate 710, which supports waveguide layer 720, which includes p+ contact region 722, p-type region 724, n-type region 726, and n+ contact region 728. In some embodiments, the substrate 710 is the buried oxide (BOX) layer of a silicon-on-insulator (SOI) structure, although this is not required by the present invention. Metal contacts 730 and 732 are provided to enable application of a voltage bias across the silicon waveguide core 740.

The cladding for the waveguide structure includes a first cladding material 745 that is disposed above and on either side of the silicon waveguide core 740 and a second cladding material 746 that is disposed above and on either side of the first cladding material 745. The first cladding material is characterized by an electro-optic coefficient, for example, a Kerr coefficient $\chi^{(3)}$ that is greater than the Kerr coefficient associated with the waveguide core 740 or a Pockels coefficient $\chi^{(2)}$ that is greater than the Pockels coefficient associated with the waveguide core 740. As an example, silicon can be utilized as the waveguide core material 740, tantalum oxide ($Ta_2O_5$) can be utilized as the first waveguide cladding material 745, and silicon dioxide ($SiO_2$) can be used as the second cladding material 746. Other suitable materials for the first waveguide cladding material and/or the second waveguide cladding material include lead zirconate titanate ($Pb[Zr_{(x)}Ti_{(1-x)}]O_3$) (PZT), barium titanate ($BaTiO_3$), strontium barium niobate (($Sr,Ba)Nb_2O_6$), combinations thereof, and the like.

Although different materials are illustrated for the first cladding material 745 and the second cladding material 746, this is not required by the present invention and the same material can be utilized for both the first and second cladding layers. As an example, the entire cladding could be fabricated using tantalum oxide ($Ta_2O_5$), in which case, there would be no distinction between the first cladding material and the second cladding material. In other embodiments, different compositions of the same material could be utilized as the first cladding material and the second cladding material. Moreover, although only two cladding layers are illustrated in FIG. 7A, it will be appreciated that more than two cladding layers could be used, for example, a thin film of a first cladding material (e.g., tantalum oxide ($Ta_2O_5$)), a thin film of a second cladding material (e.g., $HfO_2$) deposited after the first cladding material, N additional thin films of subsequent cladding materials, and a blanket coating of a final cladding material. Moreover, although a single layer of the first cladding material is illustrated in FIG. 7A, this single "layer" can be made up of multiple sub-layers of different materials or the same material. One of ordinary skill in the art would recognize many variations, modifications, and alternatives.

Thus, in contrast with conventional designs in which the electro-optical coefficient associated with the waveguide cladding is less than the electro-optical coefficient associated with the waveguide core, embodiments of the present invention utilize a waveguide design in which the electro-optical coefficient associated with the waveguide cladding is greater than the electro-optical coefficient associated with the waveguide core. Moreover, some embodiments of the present invention utilize low-loss waveguide structures that can be produced using standard silicon photonics foundry processes. Thus, slot waveguide structures characterized by high loss are not compatible with the designs provided by some embodiments of the present invention.

Since silicon has a crystal structure that is centrosymmetric, silicon has a Pockels coefficient that is equal to zero. Accordingly, some embodiments of the present invention utilize a waveguide cladding with a $\chi^{(2)}$ value greater than zero. If the silicon waveguide is fabricated using strained silicon, the waveguide cladding can have a $\chi^{(2)}$ value greater than the $\chi^{(2)}$ value for the strained silicon. In other embodiments, the waveguide cladding can exhibit a significant DC Kerr effect (i.e., via a $\chi^{(3)}$ value that is greater than the $\chi^{(3)}$ value for silicon).

Because, in the waveguide structure illustrated in FIG. 7A, the optical mode propagating in the waveguide structure and the applied electric field overlaps with both the waveguide core and waveguide cladding, the high electro-optical coefficient characterizing the first cladding will result in a significant index of refraction variation in the first cladding in addition to that produced in the waveguide core as a result of the application of the electric field across the waveguide structure. Thus, embodiments of the present invention contrast with conventional designs in which cladding material with a smaller electro-optical coefficient than the core is utilized, resulting in little variation of the index of refraction in the cladding material. Accordingly, in embodiments in which current injection is utilized to produce an index change in the waveguide core, as well as in embodiments in which an applied electric field is utilized to produce an index change in the waveguide core, the presence of the cladding characterized by a high electro-optical coefficient can result in an increase in the index change produced for a given applied voltage.

As will be evident to one of skill in the art, current can be used to induce a change in the real and imaginary index via free carrier electrorefraction or electroabsorption, respectively (i.e., by changing the carrier concentration in the optically active region). Thus, embodiments of the present invention can utilize either current-based processes or DC Kerr and Pockels effects, which can be utilized in the cladding as a result of the applied electric field. In devices that utilize both effects, current-based effects can operate in conjunction with index variation resulting from an applied electric field.

According to embodiments of the present invention, the thickness of the first cladding material 745 is sufficient to enable sufficient overlap between the optical mode and the first cladding material to achieve a desired variation in the index of refraction associated with the first cladding layer. As an example, the thickness of the first cladding layer 745 can range from about 10 nm to about 1 µm, for example, between tens of nanometers and hundreds of nanometers. As a result, the electric field lines extending from the p-type region 724 to the n-type region 726 will pass, not only through the waveguide core 740, but through the first cladding material disposed on either side of the waveguide core, as well as through at least a portion of the first cladding material disposed above the waveguide core. As described herein, the incorporation of cladding material with an electro-optical coefficient greater than that associated with the waveguide core enables increased variation in the index of refraction of the waveguide structure for a given voltage bias and applied electric field or a given variation in the index of refraction of the waveguide structure for a reduced voltage bias and applied electric field. Additionally, incorporation of cladding material with an electro-optical coefficient greater than that associated with conventional cladding materials can also be utilized.

As will be evident to one of skill in the art, the applied electric field distribution is inversely proportional to the dielectric constant. As a result, in waveguide structures, for which the dielectric constant of the core is higher than or similar to the dielectric constant of the cladding, the applied electric field in the cladding region is significant. Therefore, embodiments of the present invention utilize this fact to provide for effective use of the applied electric field in the cladding region by incorporating electro-optic materials in the cladding region.

In addition to cladding materials characterized by a Kerr coefficient $\chi^{(3)}$ that is greater than the Kerr coefficient associated with the waveguide core (or a conventional cladding), combinations of both linear (i.e., Pockels effect) and non-linear (i.e., Kerr effect) electro-optic materials can be utilized. Thus, in an embodiment, silicon relying on the Kerr effect can be utilized as the waveguide core material and PZT relying on the Pockels effect can be utilized as the first cladding material or the second cladding material. As another example, discussed above, silicon relying on the Kerr effect can be utilized as the waveguide core material and tantalum oxide ($Ta_2O_5$) also relying on the Kerr effect can be utilized as the first cladding material or the second cladding material. Thus, some embodiments utilize a structure in which the Kerr coefficient for the cladding is greater than the Kerr coefficient for the core. In other embodiments, the Pockels coefficient squared for the cladding is greater than the Kerr coefficient for the core. Combinations of materials and material properties are thus included within the scope of the present invention.

Since a variety of materials are suitable for use with embodiments of the present invention, with a significant degree of freedom for material choice and combination, CMOS compatible materials can be utilized. As will be evident to one of skill in the art, CMOS compatible materials provide the advantages of scalability and integration for large scale circuits using CMOS processes. Merely by way of example, Table 1 lists representative optical properties for several CMOS compatible materials that can be utilized for either the first cladding material or the second cladding material.

TABLE 1

| Material | $\chi^{(3)}$ ($m^2/W$) | Refractive Index (at 1.55 µm) | Dielectric Constant |
|---|---|---|---|
| Si | $2.2 \times 10^{-18}$ | ~3.5 | 11.7 |
| $Si_3N_4$ | $2 \times 10^{-19}$ | 2 | 7-8 |
|  | $1.6 \times 10^{-18}$ | 2.5 |  |
|  | $2 \times 10^{-18}$ | 2.7 |  |
| $Ta_2O_5$ | $1 \times 10^{-18}$- $4 \times 10^{-18}$ | 2.08 | 25-50 |
| $TiO_2$ | $5 \times 10^{-18}$- $6 \times 10^{-17}$ | 2.27-2.6 | 10-85 |
| Graphene Oxide | $4.5 \times 10^{-14}$ | 2.2 (at 1.2 µm) | 2-50 |

Figure 7B:
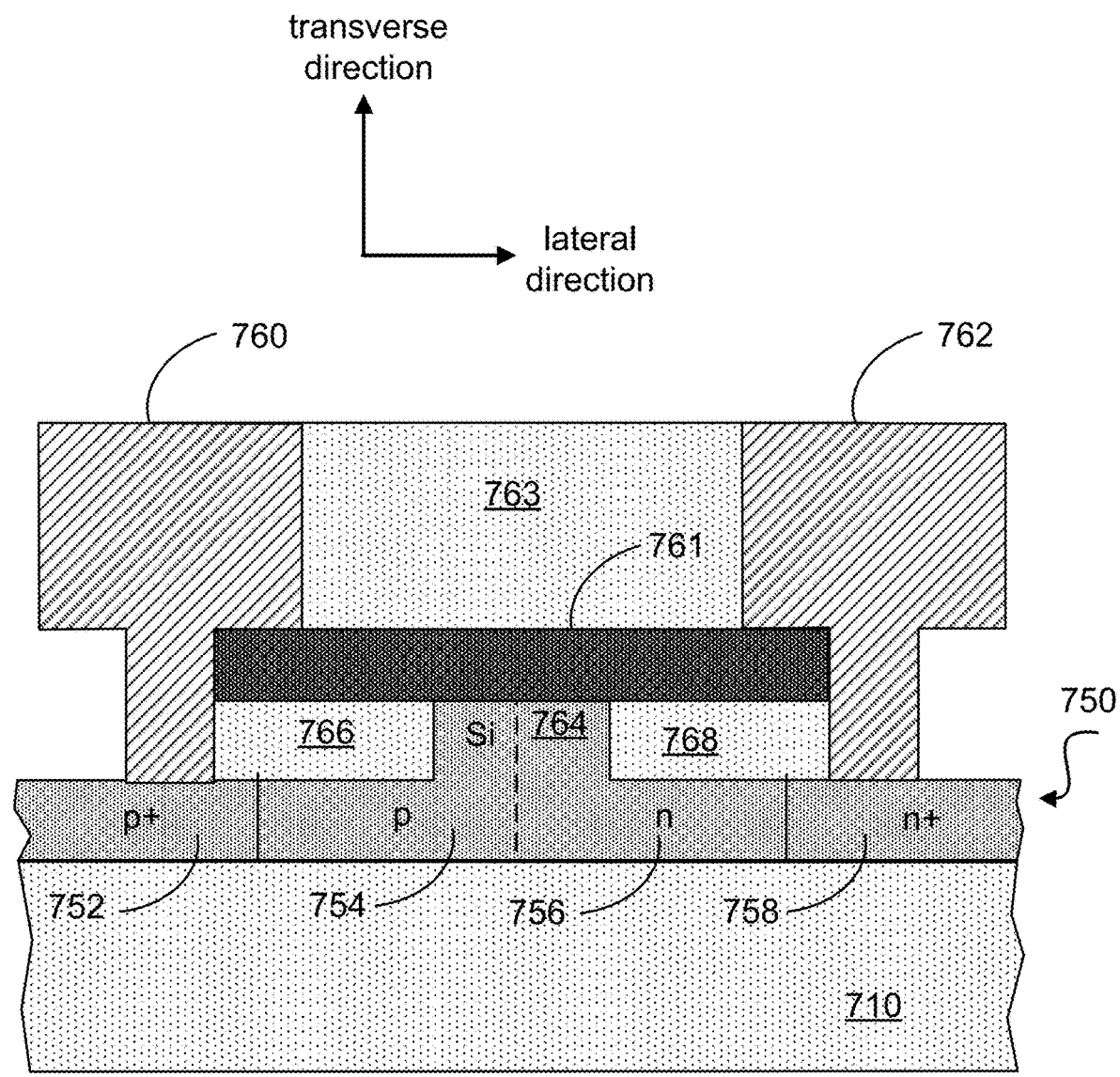
FIG. 7B is a simplified schematic diagram illustrating a p-n diode waveguide structure incorporating a planar electro-optic cladding layer according to an embodiment of the present invention.
Figure 7C:
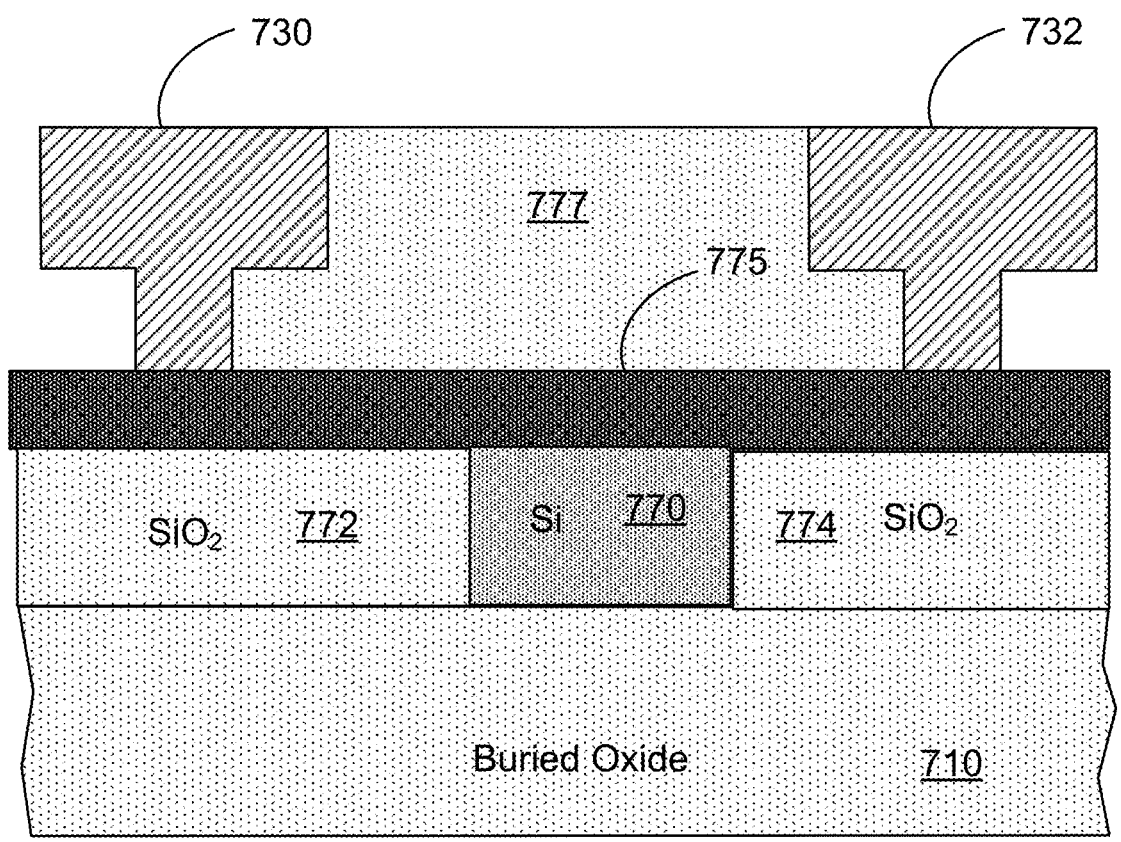
FIG. 7C is a simplified schematic diagram illustrating a buried waveguide structure incorporating a planar electro-optic cladding layer according to an embodiment of the present invention.
Figure 7D:
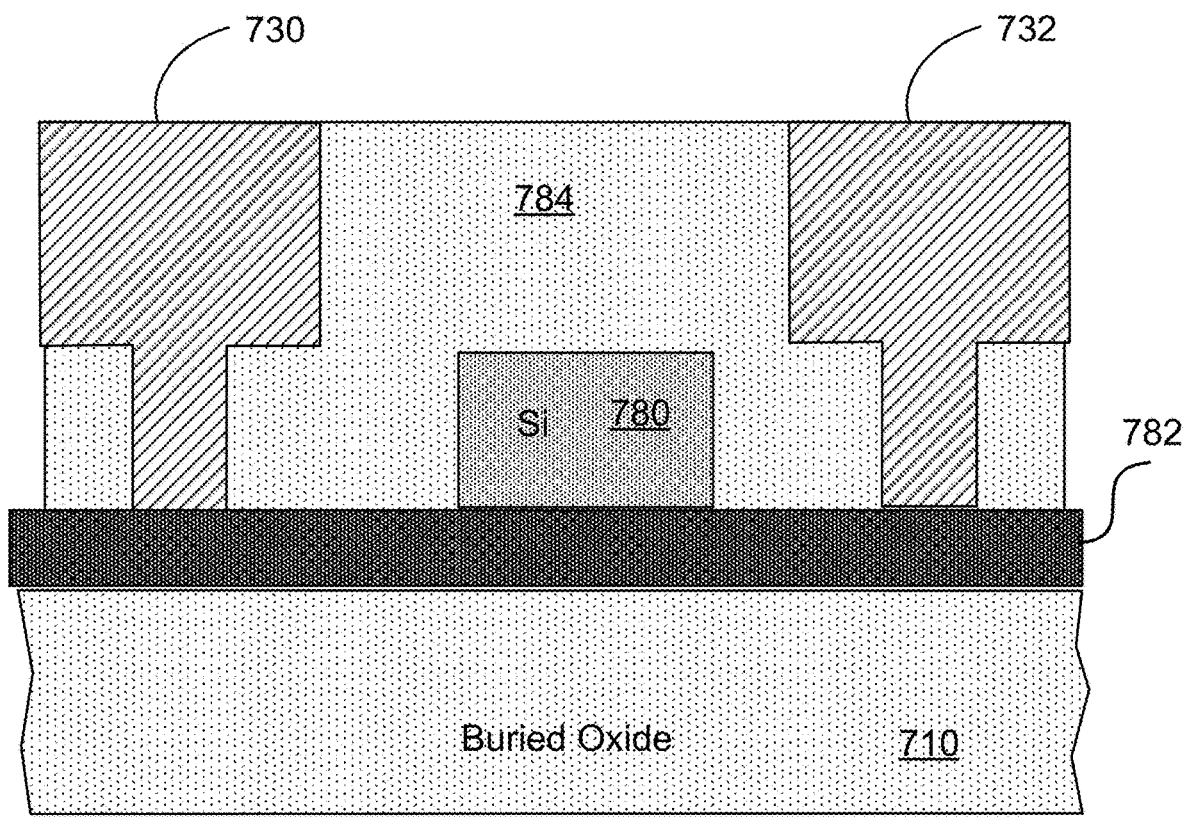
FIG. 7D is a simplified schematic diagram illustrating a buried waveguide structure incorporating a planar electro-optic cladding layer according to another embodiment of the present invention.
Figure 7E:
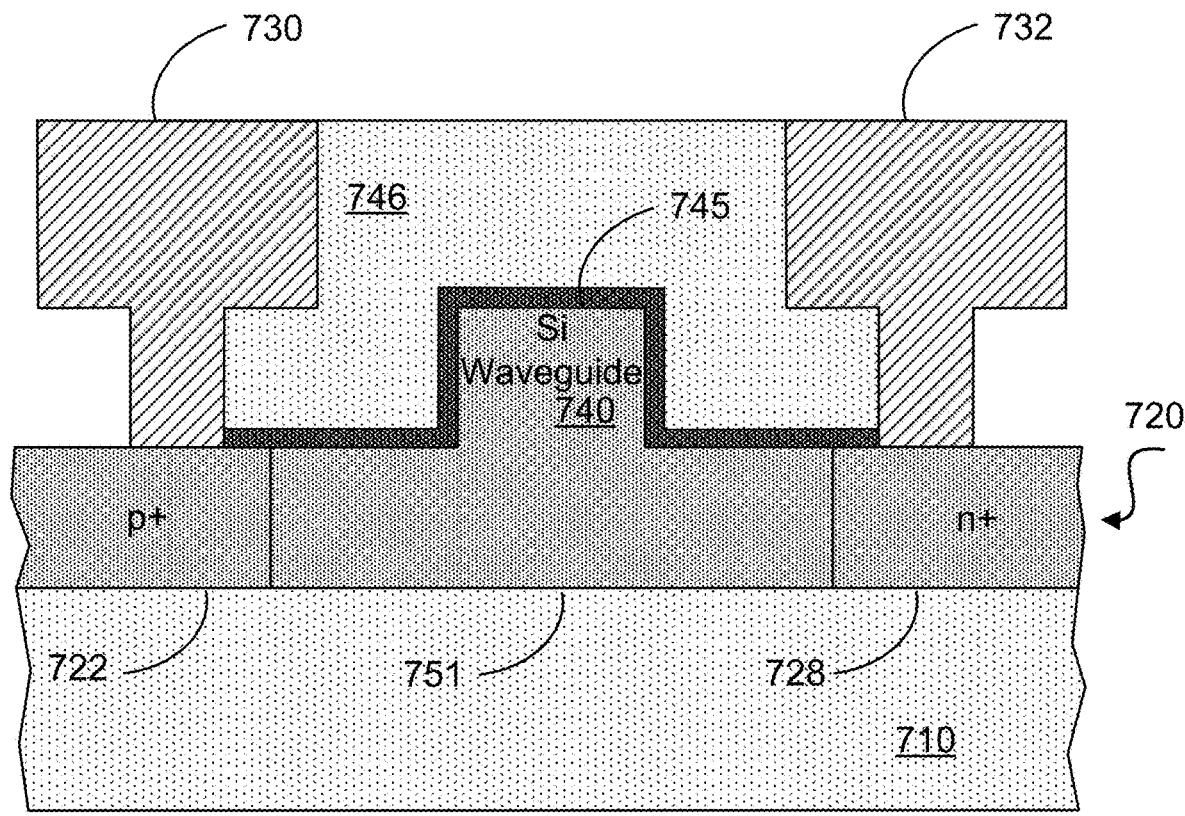
FIG. 7E is a simplified schematic diagram illustrating a waveguide structure incorporating electro-optic cladding materials according to an embodiment of the present invention.

FIG. 7E is a simplified schematic diagram illustrating a waveguide structure incorporating electro-optic cladding materials according to an embodiment of the present invention. The embodiment illustrated in FIG. 7E is similar to that illustrated in FIG. 7A, but does not utilize a p-n junction in waveguide core 740. Rather, an undoped region 751 (e.g., undoped silicon) is utilized in waveguide core 740, which is a pin junction. Otherwise, the description provided in relation to FIG. 7A is applicable to the embodiment illustrated in FIG. 7E as appropriate. One of ordinary skill in the art would recognize many variations, modifications, and alternatives.

FIG. 7B is a simplified schematic diagram illustrating a p-n diode waveguide structure incorporating a planar electro-optic cladding layer according to an embodiment of the present invention. The structure illustrated in FIG. 7B shares common elements with the structures illustrated in FIG. 7A and the discussion provided in relation to FIG. 7A is applicable to the structure illustrated in FIG. 7B as appropriate. Referring to FIG. 7A, the cross-section of the p-n diode waveguide structure includes an illustration of substrate 710, which supports waveguide layer 750, which includes p+ contact region 752, p-type region 754, n-type region 756, and n+ contact region 758. In some embodiments, the substrate 710 is the buried oxide (BOX) layer of a silicon-on-insulator (SOI) structure, although this is not required by the present invention. Metal contacts 760 and 762 are provided to enable application of a voltage bias across the silicon waveguide core 764.

The waveguide core can be formed as a silicon ridge waveguide or other suitable waveguide structure. After formation of the waveguide core 764, which can be a silicon waveguide core, a dielectric layer (e.g., $SiO_2$) is deposited and subsequently planarized to form a first portion of the waveguide cladding. As illustrated in FIG. 7B, first dielectric region 766 and second dielectric region 768 are disposed on either lateral side of waveguide core 764. After planarization, a cladding layer 761 is formed as a second portion of the waveguide cladding using a material, in some embodiments, with an electro-optic coefficient greater than the electro-optic coefficient characterizing the waveguide core. The cladding layer 761 can be deposited using a deposition process or can be transferred using a layer transfer process.

The cladding layer 761 is characterized by an electro-optic coefficient, for example, a Kerr coefficient $\chi^{(3)}$ that is greater than the Kerr coefficient associated with the waveguide core 764 or a Pockels coefficient $\chi^{(2)}$ that is greater than the Pockels coefficient associated with the waveguide core 764. As an example, silicon can be utilized as the waveguide core material 764, tantalum oxide ($Ta_2O_5$) can be utilized as the cladding layer 761, and silicon dioxide ($SiO_2$) can be used as the material for the first portion of the waveguide cladding. As illustrated in FIG. 7B, one or more additional (optional) cladding layers 763 can be formed on the first cladding layer to provide the desired optical confinement. As an example, silicon dioxide ($SiO_2$) can be deposited on the cladding layer 761 to form an additional cladding layer. The cladding materials can utilize suitable materials as discussed in relation to FIG. 7A.

Although different materials are illustrated in FIG. 7B for the first portion of the waveguide cladding and the second portion of the waveguide cladding, this is not required by the present invention and the same material can be utilized for both the first portion of the waveguide cladding and the second portion of the waveguide cladding. As an example, after formation of the ridge waveguide, tantalum oxide ($Ta_2O_5$) could be deposited and planarized to form the first portion of the waveguide cladding and the second portion of the waveguide cladding. Alternatively, after formation of the ridge waveguide, tantalum oxide ($Ta_2O_5$) could be deposited and planarized to form the first portion of the waveguide cladding. Subsequently, a layer transfer process could be utilized to position cladding layer 761 above the waveguide core. The discussion of alternative materials and structures as described in relation to FIG. 7A is applicable to the embodiment illustrated in FIG. 7B as appropriate. One of ordinary skill in the art would recognize many variations, modifications, and alternatives.

In some embodiments, the width of the waveguide core is greater than the height of the waveguide core. In these embodiments, interaction with the cladding material above and below the waveguide core will more significant than the interaction with the cladding material to the sides of the waveguide core as a result of the differences in dimension. Therefore, in aligning the crystal axes of the cladding material to the applied electric field, the dimensions of the structure as well as the geometry and materials, which define the orientation of the applied electric field may be taken into consideration. As will be evident to one of skill in the art, the dielectric constant, the Pockels effect, and the Kerr effect are described by tensors and, therefore, embodiments of the present invention can utilize specific geometries for crystalline materials in which the crystallographic orientation relative to the device geometry provides desired properties for the cladding both on top of and next to the waveguide core.

Because embodiments of the present invention utilize the DC Kerr effect and/or the Pockels effect, the crystal orientation of the electro-optic material is controlled to align the applied electric field with respect to the crystal axes of the electro-optic material in order to maximize the electro-optic effect. Moreover, the polarization of the light propagating in the waveguide is aligned with respect to the crystal axes of the electro-optic material. Thus, alignment between the crystal axes and the applied electric field (e.g., at frequencies of gigahertz and below, which may be referred to as the "DC" electric field in contrast with optical frequencies) as well as alignment between the crystal axes and the electric field of the optical mode (e.g., at optical frequencies) are implemented according to embodiments of the present invention. Moreover, the orientation of the waveguide (i.e. the propagation direction of the light) with respect to the crystallographic axes is also controlled in some embodiments.

For example, as illustrated in FIG. 7B, the electro-optic cladding material 761 is characterized by crystal axes and electro-optic coefficients characterized by a tensor. The crystal orientation of the cladding material, and the direction of propagation of the transmitted light and its polarization direction, can be aligned so that the largest value of the electro-optic material coefficient tensor is utilized. Thus, in FIG. 7B, the crystal orientation of the cladding material is such that the largest value of the electro-optic material coefficient tensor is utilized. As a result, the change in index of refraction produced by the application of the applied electric field is maximized. As will be evident to one of skill in the art, the maximization of these values is not required by the present invention and embodiments of the present invention include implementations in which coefficients of the Pockels or Kerr effect tensors that are not the largest coefficients are utilized. These embodiments are included within the scope of the present invention.

Moreover, the polarization of the optical mode is selected to align the electric field at optical frequencies with the largest value of the electro-optic material coefficient tensor. Referring to FIG. 7B, if the polarization of the optical mode is a transverse electric (TE) mode, the optical electric field is polarized in the plane of the figure (e.g., along the lateral direction) and perpendicular to the longitudinal direction of the waveguide, which is normal to the plane of the figure and orthogonal to the lateral and transverse directions. Thus, the optical electric field and the applied electric field are both aligned along the lateral direction in an embodiment. In order to maximize the index of refraction change produced by the applied electric field, the crystal structure of the cladding material is aligned as discussed above. As an example, barium titanate (BaTiO$_3$) is characterized by a tetragonal crystal structure. Thus, for BaTiO$_3$, the c-axis is aligned along the lateral direction with the a-axes perpendicular to the lateral direction to achieve the largest electro-optic coefficient.

In some embodiments utilizing materials with non-cubic crystal structures, the cladding material is formed such that half of the crystallographic domains are oriented with their c-axis in a first direction in-plane direction and half of the domains are oriented in a second direction in-plane direction perpendicular to the first direction. For these embodiments, the cladding material can be oriented such that the applied electric field and/or the optical electric field polarization are perpendicular to the vector bisecting the first direction and the second direction, i.e., oriented at 45° to the first direction and the second direction to provide a component of the applied electric field that utilizes the largest of the electro-optic material coefficient tensor component. Thus, the index of refraction change due to the applied electric field is maximized by optimizing the utilization of the largest components of the Pockels and/or Kerr effect tensors. One of ordinary skill in the art would recognize many variations, modifications, and alternatives.

Thus, some embodiments of the present invention utilize the electrode geometry (to define the orientation of the applied electric field), the crystal orientation of the cladding material (to define the electro-optic material tensor alignment), and/or the waveguide geometry (to define the optical electric field polarization and light propagation direction) to ensure that the index of refraction change resulting from the DC Kerr effect (e.g., in both the silicon waveguide core and the electro-optic material cladding) complements the index of refraction change resulting from the Pockels effect in the electro-optic material cladding. As described more fully in relation to FIGS. 12A-12D, embodiments utilize materials and structures that enable the DC Kerr effect to complement or work in conjunction with the Pockels effect, i.e., linear and non-linear electro-optic effects complementing each other.

Figure 12A:
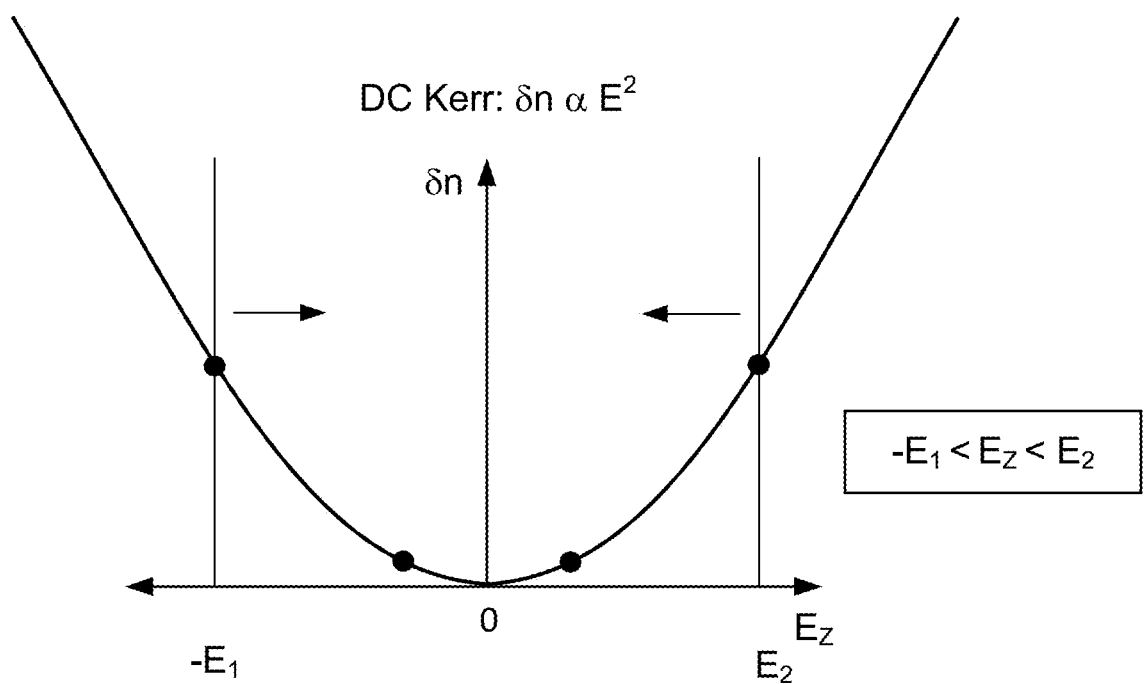
FIG. 12A is a graph plotting the DC Kerr effect as a function of applied electric field for a first material type according to an embodiment of the present invention.
Figure 12B:
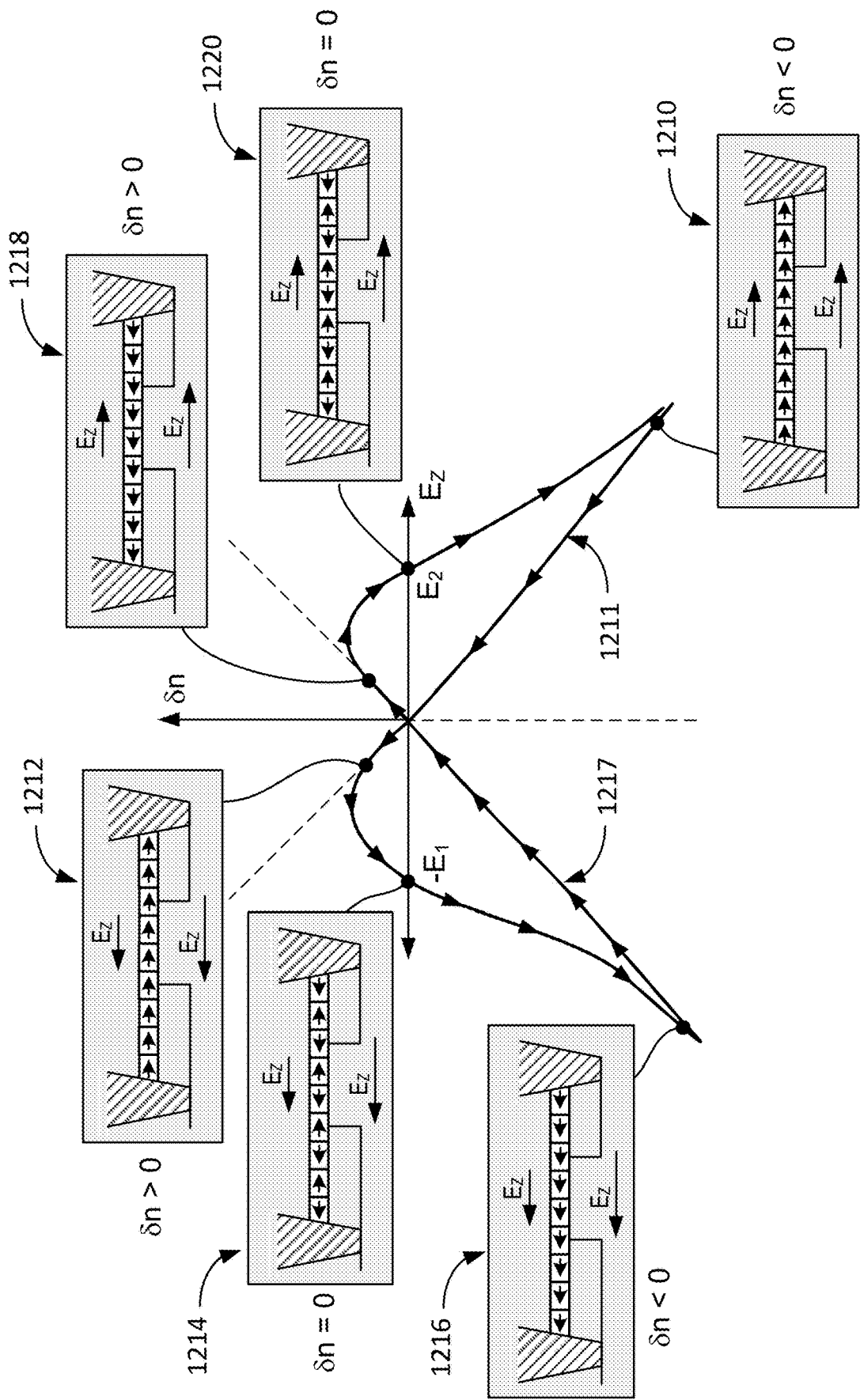
FIG. 12B is a graph plotting the Pockels effect as a function of applied electric field for a first material type according to an embodiment of the present invention.
Figure 12C:
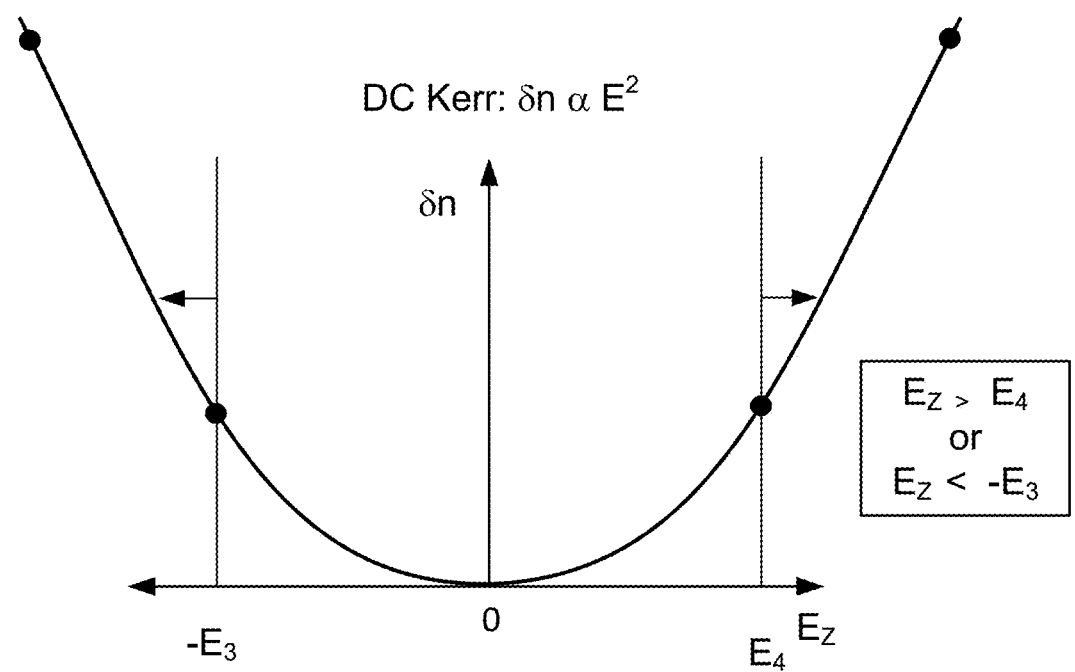
FIG. 12C is a graph plotting the DC Kerr effect as a function of applied electric field for a second material type according to an embodiment of the present invention.
Figure 12D:
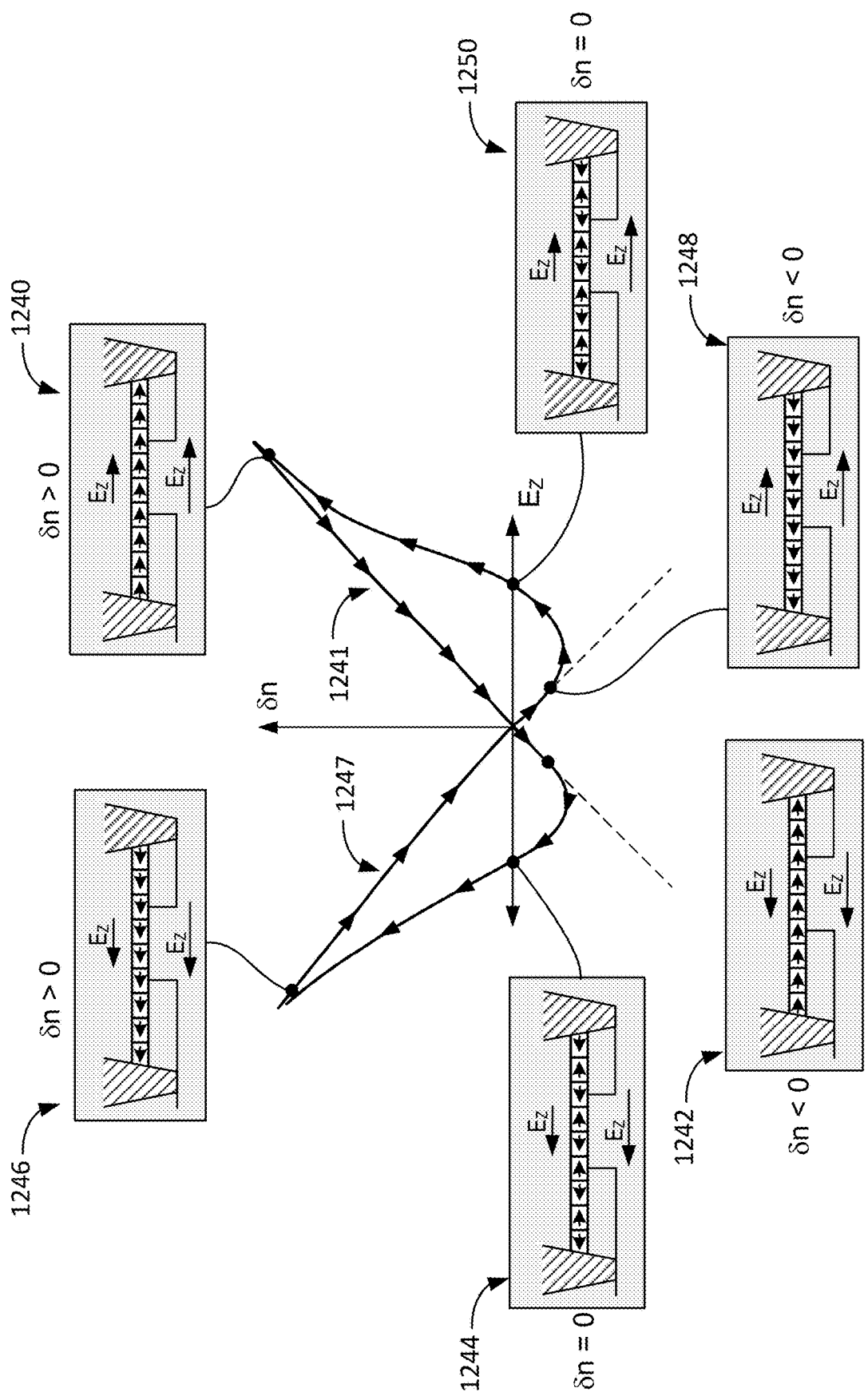
FIG. 12D is a graph plotting the Pockels effect as a function of applied electric field for a second material type according to an embodiment of the present invention.

In FIGS. 12A-12D, the polarization domains in the thin film as illustrated by arrows pointing in either the positive z-direction or the negative z-direction, which for the implementation shown in FIGS. 12A-12D, is an in-plane direction. As illustrated at various applied electric fields, the polarization domains can be aligned with the applied electric field as illustrated at 1210 and 1216 in FIG. 12B and at 1240 and 1246 in FIG. 12D or can be anti-aligned with the applied electric field as illustrated at 1212 and 1218 in FIG. 12B and at 1242 and 1248 in FIG. 12D. Depending on the material type, i.e., a first material type as illustrated in FIGS. 12A and 12B or a second material type as illustrated in FIGS. 12C and 12D, the alignment of the polarization domains with the applied electric field can result in an index of refraction change that is either positive or negative. In FIGS. 12A and 12B, the first material type results in a negative refractive index change due to an applied electric field when the polarization domains are aligned with the applied electric field. In FIGS. 12C and 12D, the second material type results in a positive refractive index change due to an applied electric field when the polarization domains are aligned with the applied electric field. In both cases, when the half of the polarization domains are aligned with the applied electric field and half of the polarization domains are anti-aligned with the applied electric field, the change in index of refraction due to an applied electric field is approximately zero.

A one-dimensional model for the first material type is:

$$\delta n = \left(\frac{n^3}{2}r_{eff}E_z\right)\rho_{\downarrow z} - \left(\frac{n^3}{2}r_{eff}E_z\right)\rho_{\uparrow z}$$

where $\delta n$ is the change in refractive index due to an applied field $E_z$, $r_{eff}$ is the effective Pockels coefficient, $p_{\downarrow z}$ is the area fraction of polarization domains that are polarized anti-parallel to the positive z-direction, $p_{\uparrow z}$ is the area fraction of polarization domains that are polarized parallel to the positive z-direction. For the first material type, a negative index change occurs when the fraction of polarization domains that are polarized parallel to the applied electric field $E_z$ are greater than the fraction of polarization domains that are polarized anti-parallel to the applied electric field $E_z$.

A one-dimensional model for the second material type is:

$$\delta n = \left(\frac{n^3}{2}r_{eff}E_z\right)\rho_{\uparrow z} - \left(\frac{n^3}{2}r_{eff}E_z\right)\rho_{\downarrow z}$$

For the second material type, a positive index change occurs when the area fraction of polarization domains that are polarized parallel to the positive z-direction are greater than the area fraction of polarization domains that are polarized anti-parallel to the positive z-direction.

FIG. 12A is a graph plotting the DC Kerr effect as a function of applied electric field for a first material type according to an embodiment of the present invention. As illustrated in FIG. 12A, the DC Kerr effect is characterized by a positive index change for all applied voltages.

FIG. 12B is a graph plotting the refractive index change due to the Pockels effect as a function of applied electric field for a first material type according to an embodiment of the present invention. The polarization direction of the polarization domains (i.e., aligned with the positive z-direction or the negative z-direction) is hysteretic depending on the applied electric field because, as a result of the application of the electric field, the polarization direction can be modified by the application of the electric field. Referring to 1210, the polarization direction of all polarization domains is aligned with the positive z-direction. The applied electric field is also directed in the positive z-direction. Since, for the first material type, a negative index change occurs when the fraction of polarization domains that are polarized parallel to the applied electric field are greater than the fraction of polarization domains that are polarized anti-parallel to the applied electric field, at 1210, the index change is negative.

As the amplitude of the applied electric field is reduced from the positive value illustrated at 1210, the index change travels along curve 1211, with the negative index change decreasing in absolute value toward zero at an applied electric field of zero. At 1212, a small negative electric field is oriented anti-parallel to the polarization domains, which are still mostly aligned with the positive z-direction, i.e., $\rho_{\uparrow z}$~1, resulting in a positive index change. As the applied electric field continues to decrease (i.e., a larger magnitude negative voltage), some of the polarization domains begin to flip to be polarized to align with the applied electric field and at 1214, $\rho_{\uparrow z}$~0.5 and $\rho_{\downarrow z}$~0.5, resulting in an index change of zero at applied electric field $-E_1$. Continued decrease in the applied electric field results in a decrease in the index change until all polarization domains are aligned with the applied electric field at 1216.

As the amplitude of the applied electric field is decreased from the negative value illustrated at 1216, the index change travels along curve 1217, with the negative index change decreasing in absolute value toward zero at an applied electric field of zero. At 1218, a small positive electric field is oriented anti-parallel to the polarization domains, which are still mostly aligned with the negative z-direction, i.e., $\rho_{\downarrow z} \sim 1$, resulting in a positive index change. As the applied electric field continues to increase, some of the polarization domains begin to flip to be polarized to align with the applied electric field and at 1220, $\rho_{\uparrow z} \sim 0.5$ and $\rho_{\downarrow z} \sim 0.5$, resulting in an index change of zero at applied electric field $E_2$. Continued increases in the applied electric field results in a decrease in the index change until all polarization domains are aligned with the applied electric field at 1210.

Referring to both FIGS. 12A and 12B, since the DC Kerr effect is positive for all applied electric fields, operation between the voltages $-E_1$ and $E_2$ will result in positive index changes as a result of the Pockels effect (i.e., $-E_1 < E_z < E_2$).

FIG. 12C is a graph plotting the DC Kerr effect as a function of applied electric field for a second material type according to an embodiment of the present invention. As illustrated in FIG. 12C, the DC Kerr effect is characterized by a positive index change for all applied voltages.

FIG. 12D is a graph plotting the Pockels effect as a function of applied electric field for a second material type according to an embodiment of the present invention. In a manner similar to that discussed in relation to FIG. 12B, as the amplitude of the applied electric field is reduced from the positive value illustrated at 1240, the index change travels along curve 1241, with the positive index change decreasing in value toward zero at an applied electric field of zero. At 1242, a small negative electric field is oriented anti-parallel to the polarization domains, which are still mostly aligned with the positive z-direction, i.e., $\rho_{\uparrow z} \sim 1$, resulting in a negative index change. As the applied electric field continues to decrease, some of the polarization domains begin to flip to be polarized to align with the applied electric field and at 1244, $\rho_{\uparrow z} \sim 0.5$ and $\rho_{\downarrow z} \sim 0.5$, resulting in an index change of zero at applied electric field $-E_3$. Continued decrease in the applied electric field results in a decrease in the index change until all polarization domains are aligned with the applied electric field at 1246.

As the amplitude of the applied electric field is decreased from the negative value illustrated at 1246, the index change travels along curve 1247, with the negative index change decreasing in absolute value toward zero at an applied electric field of zero. At 1248, a small positive electric field is oriented anti-parallel to the polarization domains, which are still mostly aligned with the negative z-direction, i.e., $\rho_{\downarrow z} \sim 1$, resulting in a negative index change. As the applied electric field continues to increase, some of the polarization domains begin to flip to be polarized to align with the applied electric field and at 1250, $\rho_{\uparrow z} \sim 0.5$ and $\rho_{\downarrow z} \sim 0.5$, resulting in an index change of zero at applied electric field $E_4$. Continued increases in the applied electric field results in a decrease in the index change until all polarization domains are aligned with the applied electric field at 1240.

Referring to both FIGS. 12C and 12D, since the DC Kerr effect is positive for all applied electric fields, operation at voltages less than $-E_3$ and greater than $E_4$ will result in positive index changes as a result of the Pockels effect (i.e., $E_z < -E_1$ or $E_2 < E_z$). For the second type of material, regardless of the initial poling of the polarization domains, opera-tion at applied electric fields in the ranges $E_z < -E_1$ or $E_2 < E_z$ will result in a positive index change. Additionally, depending on the initial poling of the polarization domains, operation at lower voltages associated with positive index changes is possible along curve 1241, starting with positively poled material (1240) and along curve 1247, starting with negative poled material (1246). Some embodiments of the present invention utilizing the second type of material provide stability since operation at applied electric fields in the ranges $E_z < -E_3$ or $E_4 < E_z$ will result in the application of high fields to material that is polarized in the same direction as the applied electric field. It should be noted that the lower operating biases illustrated in FIGS. 12A and 12B will result in lower power operation.

In some embodiments, the electro-optic material can be periodically or non-periodically poled to established desired alignment of the polarization domains. In other embodiments, operating at cryogenic temperatures, the polarization state may be maintained, obviating the need for periodic poling operations.

FIG. 7C is a simplified schematic diagram illustrating a buried waveguide structure incorporating a planar electro-optic cladding layer according to an embodiment of the present invention. The structure illustrated in FIG. 7C shares common elements with the structures illustrated in FIGS. 7A and 7B and the discussion provided in relation to FIGS. 7A and 7B is applicable to the structure illustrated in FIG. 7C as appropriate. For purposes of clarity, the conductivity type of the various materials is not illustrated in FIG. 7C, but materials with differing conductivity as illustrated in FIGS. 7A and 7B can be utilized in the structure illustrated in FIG. 7C as appropriate. As illustrated in FIG. 7C, substrate 710 supports buried waveguide 770, which is illustrated as positioned between first dielectric region 772, which as illustrated in FIG. 7C can be $SiO_2$, and second dielectric region 774, which as illustrated in FIG. 7C can be $SiO_2$. These first and second dielectric regions 772 and 774 can be considered as a first portion of the waveguide cladding.

A cladding layer 775 is formed as a second portion of the waveguide cladding using a material with an electro-optic coefficient greater than the electro-optic coefficient characterizing the waveguide core. The cladding layer 775 can be deposited using a deposition process or can be transferred using a layer transfer process. In some embodiments, the second portion of the waveguide cladding could use a material with an electro-optic coefficient less than the electro-optic coefficient characterizing the waveguide core and still provide benefits not available using conventional cladding materials if the waveguide cladding has an electro-optic coefficient greater than that of a conventional cladding material.

The cladding layer 775 is characterized by an electro-optic coefficient, for example, a Kerr coefficient $\chi^{(3)}$ that is greater than the Kerr coefficient associated with the waveguide core 770 or a Pockels coefficient $\chi^{(2)}$ that is greater than the Pockels coefficient associated with the waveguide core 770. As an example, silicon can be utilized as the waveguide core material 770, tantalum oxide ($Ta_2O_5$) can be utilized as the cladding layer 775, and silicon dioxide ($SiO_2$) can be used as the material for the first dielectric region 772 and second dielectric region 774 (i.e., the first portion of the waveguide cladding). As illustrated in FIG. 7C, one or more additional cladding layers 777 can be formed on the first cladding layer to provide the desired optical confinement. As an example, silicon dioxide ($SiO_2$) can be deposited on the first cladding layer 775 to form an additional cladding layer 777. The cladding materials can utilize suitable materials as discussed in relation to FIGS. 7A and 7B.

In order to establish an applied electric field extending through the cladding layer 775 and the waveguide core 770, a bias voltage is applied to electrodes 730 and 732, which can be metal electrodes or other suitable materials that provide electrical conductivity. In some embodiments, electrical contact is provided to the waveguide materials, which may include doped regions that form a p-n junction as illustrated in FIG. 7A, in order to prevent carrier screening that may result from application of the electric field across the waveguide core.

FIG. 7D is a simplified schematic diagram illustrating a buried waveguide structure incorporating a planar electro-optic cladding layer according to another embodiment of the present invention. The structure illustrated in FIG. 7D shares common elements with the structures illustrated in FIGS. 7A, 7B, and 7C and the discussion provided in relation to FIGS. 7A, 7B, and 7C is applicable to the structure illustrated in FIG. 7D as appropriate. For purposes of clarity, the conductivity type of the various materials is not illustrated in FIG. 7D, but materials with differing conductivity as illustrated in FIGS. 7A and 7B can be utilized in the structure illustrated in FIG. 7D as appropriate. As illustrated in FIG. 7D, substrate 710 supports buried waveguide 780, which is illustrated as positioned above a planar cladding layer 782 and partially surrounded by a second cladding layer 784.

Planar cladding layer 782 is formed using a material with an electro-optic coefficient greater than the electro-optic coefficient characterizing the waveguide core 780. The planar cladding layer 782 can be deposited using a deposition process or can be transferred using a layer transfer process. As discussed above, the planar cladding layer could use a material with an electro-optic coefficient less than the electro-optic coefficient characterizing the waveguide core and still provide benefits not available using conventional cladding materials if the planar cladding has an electro-optic coefficient greater than that of a conventional cladding material.

Planar cladding layer 782 is characterized by an electro-optic coefficient, for example, a Kerr coefficient $\chi^{(3)}$ that is greater than the Kerr coefficient associated with the waveguide core 780 or a Pockels coefficient $\chi^{(2)}$ that is greater than the Pockels coefficient associated with the waveguide core 780. As an example, silicon can be utilized as the waveguide core material 780, tantalum oxide ($Ta_2O_5$) can be utilized as planar cladding layer 782, and silicon dioxide ($SiO_2$) can be used as the material for the second dielectric layer 784. The cladding materials can utilize suitable materials as discussed in relation to FIGS. 7A, 7B, and 7C.

In order to establish an applied electric field extending through the cladding layer 782 and the waveguide core 780, a bias voltage is applied to electrodes 730 and 732, which can be metal electrodes or other suitable materials that provide electrical conductivity. In some embodiments, electrical contact is provided to the waveguide materials, which may include doped regions that form a p-n junction as illustrated in FIG. 7A, in order to prevent carrier screening that may result from application of the electric field across the waveguide core.

Figure 8:
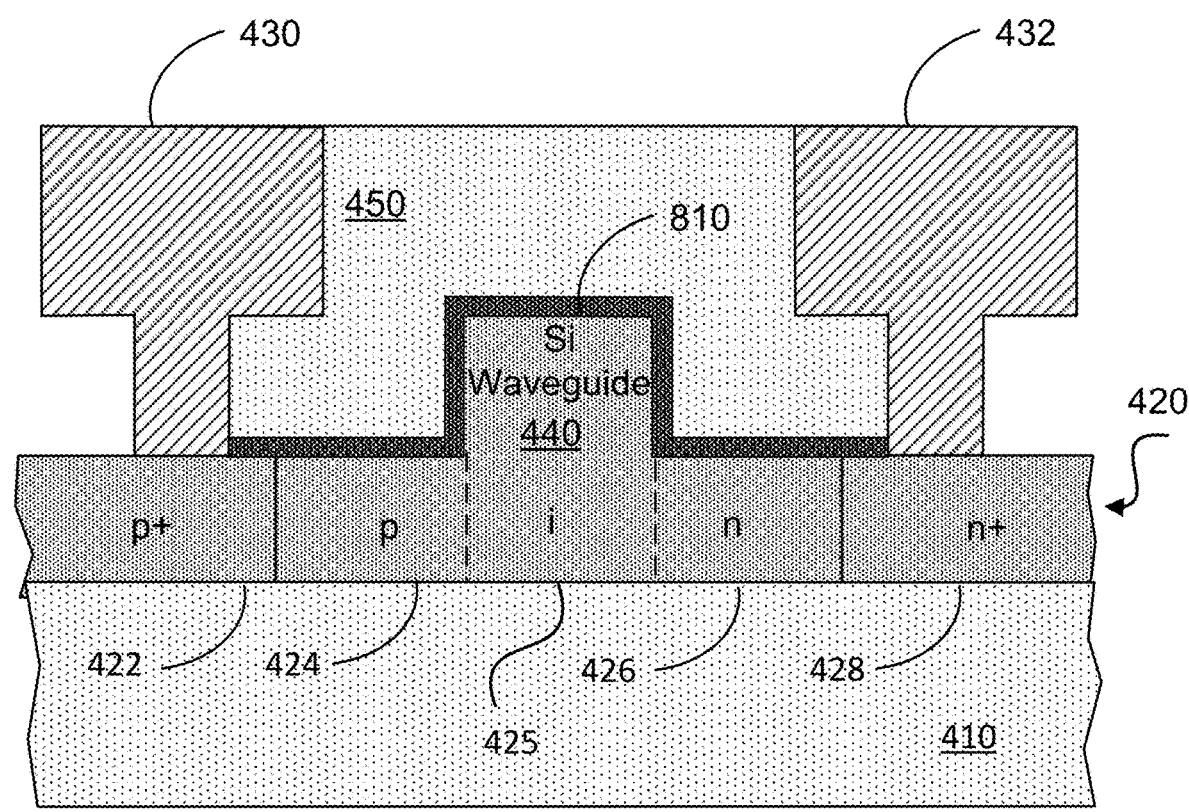
FIG. 8 is a simplified schematic diagram illustrating a p-i-n diode waveguide structure incorporating electro-optic cladding materials according to an embodiment of the present invention.

FIG. 8 is a simplified schematic diagram illustrating a p-i-n diode waveguide structure incorporating electro-optic cladding materials according to an embodiment of the present invention. The p-i-n diode waveguide structure illustrated in FIG. 8 shares similarities with the p-n diode waveguide structure illustrated in FIG. 4 and the discussion provided in relation to FIG. 4 is applicable to FIG. 8 as appropriate.

Referring to FIG. 8, the cross-section of the p-i-n diode waveguide structure includes an illustration of substrate 410, which supports waveguide layer 420, which includes p+ contact region 422, p-type region 424, intrinsic region 425, n-type region 426, and n+ contact region 428. In some embodiments, the substrate 410 is the buried oxide (BOX) layer of a silicon-on-insulator (SOI) structure, although this is not required by the present invention. Metal contacts 430 and 432 are provided to enable application of a voltage bias across the silicon waveguide core 440.

The cladding for the waveguide structure includes a first cladding material 745 that is disposed above and on either side of the silicon waveguide core 740 and a second cladding material 746 that is disposed above and on either side of the first cladding material 745. The first cladding material can be referred to as a proximal cladding material 810 since it is adjacent to and disposed on either side of the silicon waveguide core 440 and the second cladding material can be referred to as a distal cladding material 450.

The first cladding material is characterized by an electro-optic coefficient, for example, a Kerr coefficient $\chi^{(3)}$ that is greater than the Kerr coefficient associated with the waveguide core 440 or a Pockels coefficient $\chi^{(2)}$ that is greater than the Pockels coefficient associated with the waveguide core 440. As an example, silicon can be utilized as the waveguide core material 440, hafnium oxide ($HfO_2$) or tantalum oxide ($Ta_2O_5$) can be utilized as the first waveguide cladding material 810, and silicon dioxide ($SiO_2$) can be used as the second cladding material 450. Other suitable materials for the first waveguide cladding material and/or the second waveguide cladding material include lead zirconate titanate ($Pb[Zr_{(x)}Ti_{(1-x)}]O_3$) (PZT), barium titanate ($BaTiO_3$), strontium barium niobate (($Sr,Ba)Nb_2O_6$), combinations thereof, and the like.

Although different materials are illustrated for the first cladding material 810 and the second cladding material 450, this is not required by the present invention and the same material can be utilized for both the first and second cladding layers. As an example, the entire cladding could be fabricated using tantalum oxide ($Ta_2O_5$), in which case, there would be no distinction between the first cladding material and the second cladding material. In other embodiments, different compositions of the same material could be utilized as the first cladding material and the second cladding material. Moreover, although only two cladding layers are illustrated in FIG. 8, it will be appreciated that more than two cladding layers could be used, for example, a thin film of a first cladding material (e.g., tantalum oxide ($Ta_2O_5$)), a thin film of a second cladding material (e.g., $HfO_2$) deposited after the first cladding material, N additional thin films of subsequent cladding materials, and a blanket coating of a final cladding material. Moreover, although a single layer of the first cladding material is illustrated in FIG. 8, this single "layer" can be made up of multiple sub-layers of different materials or the same material. One of ordinary skill in the art would recognize many variations, modifications, and alternatives.

In order to vary the index of refraction in the waveguide core, a voltage bias is applied using metal contacts 430 and 432, also referred to as electrodes. As an example, the p-i-n junction can be placed under reverse bias, generating a depletion region in the intrinsic region 425. Thus, application of the reverse voltage bias will result in generation of an electric field in the waveguide core as well as in the cladding regions. As discussed above, the incorporation of the high-κ cladding material will result in an increased percentage of the voltage bias being dropped across the waveguide core, thereby either increasing the index of refraction change at a given voltage bias or providing a given index of refraction change at a lower voltage bias.

Although a silicon waveguide core and hafnium oxide first cladding can be utilized in the embodiment illustrated in FIG. 8, other materials can be utilized according to embodiments of the present invention. For example, in addition to silicon, other materials including SiN, Ge, SiGe, and various polymers can be utilized for the waveguide core. Moreover, in addition to hafnium dioxide, other materials including tantalum oxide ($Ta_2O_5$), zirconium oxide ($ZrO_2$), titanium dioxide ($TiO_2$), other refractory metal oxides, combinations thereof, or the like can be utilized for the first waveguide cladding.

Figure 9:
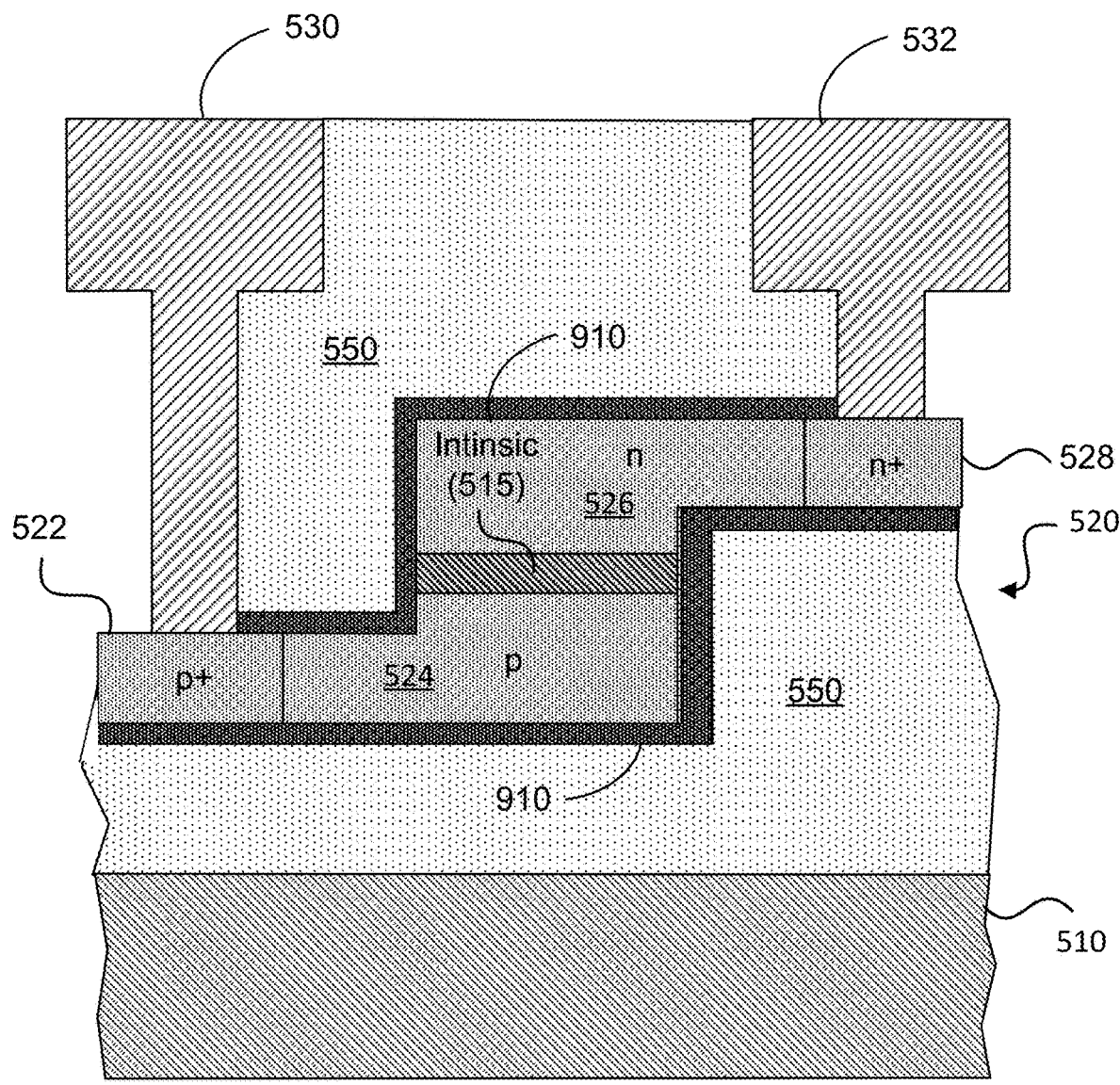
FIG. 9 is a simplified schematic diagram illustrating a vertical pin waveguide structure incorporating high-κ materials according to an embodiment of the present invention.

FIG. 9 is a simplified schematic diagram illustrating a vertical pin waveguide structure incorporating high-κ materials according to an embodiment of the present invention. The vertical pin waveguide structure illustrated in FIG. 9 shares similarities with the p-n diode waveguide structure illustrated in FIG. 5 and the discussion provided in relation to FIG. 5 is applicable to FIG. 9 as appropriate.

Referring to FIG. 9, the cross-section of the vertical pin waveguide structure includes an illustration of substrate 510, which supports waveguide region 520, which includes p+ contact region 522, p-type region 524, n-type region 526, and n+ contact region 528. The optical waveguide is defined by the p-type region 524, intrinsic silicon layer 515, and the n-type region 526. In some embodiments, the substrate 510 is the buried oxide (BOX) layer of a silicon-on-insulator (SOI) structure, although this is not required by the present invention. Metal contacts 530 and 532 are provided to enable application of a voltage bias across the vertical pin formed by the p-type region 524, the intrinsic layer 515, and the n-type region 526.

The cladding for the waveguide structure includes a first cladding material 910 that is disposed above, below, and on either side of the waveguide structure and a second cladding material 550 that is disposed above, below, and on either side of the first cladding material 910. The first cladding material can be referred to as a proximal cladding material since it is adjacent to and disposed on either side of the waveguide structure and the second cladding material can be referred to as a distal cladding material.

The first cladding material 910 is characterized by an electro-optic coefficient, for example, a Kerr coefficient $\chi^{(3)}$ that is greater than the Kerr coefficient associated with the waveguide structure or a Pockels coefficient $\chi^{(2)}$ that is greater than the Pockels coefficient associated with the waveguide structure. As discussed in relation to FIG. 8, hafnium oxide ($HfO_2$) or tantalum oxide ($Ta_2O_5$) can be utilized as the first waveguide cladding material 910, and silicon dioxide ($SiO_2$) can be used as the second cladding material 550. Other suitable materials for the first waveguide cladding material and/or the second waveguide cladding material include lead zirconate titanate ($Pb[Zr_{(x)}Ti_{(1-x)}]O_3$) (PZT), barium titanate ($BaTiO_3$), strontium barium niobate (($Sr,Ba)Nb_2O_6$), combinations thereof, and the like.

Moreover, although different materials are illustrated for the first cladding material 910 and the second cladding material 550, this is not required by the present invention and the same material can be utilized for both the first and second cladding layers. As an example, the entire cladding could be fabricated using tantalum oxide ($Ta_2O_5$), in which case, there would be no distinction between the first cladding material and the second cladding material. In other embodiments, different compositions of the same material could be utilized as the first cladding material and the second cladding material. Moreover, although only two cladding layers are illustrated in FIG. 9, it will be appreciated that more than two cladding layers could be used, for example, a thin film of a first cladding material (e.g., tantalum oxide ($Ta_2O_5$)), a thin film of a second cladding material (e.g., $HfO_2$) deposited after the first cladding material, N additional thin films of subsequent cladding materials, and a blanket coating of a final cladding material. Moreover, although a single layer of the first cladding material is illustrated in FIG. 9, this single "layer" can be made up of multiple sub-layers of different materials or the same material. One of ordinary skill in the art would recognize many variations, modifications, and alternatives.

In the vertical pin waveguide structure illustrated in FIG. 9, a guided mode is supported with a peak amplitude that is generally aligned with the intrinsic layer 515. The intrinsic layer 515 can be fabricated using a suitable undoped or low-doped semiconductor, for example, silicon if p-type region 524 and n-type region 526 are silicon. In some embodiments, the thickness of the intrinsic layer 515 ranges from about 0 nm to about 100 nm, for example, 30 nm.

In some embodiments, biasing of the metal contacts 530 and 532 can result in carrier accumulation at the interfaces between the p-type region 524 and the insulator layer 515 and the n-type region 526 and the insulator layer 515. The carrier accumulation will result in the generation of an electric field in the optically active region as well as potentially in the cladding regions surrounding the optically active region. The use of the large electro-optic coefficient material for the first cladding material 910 will, for a given change index of refraction, enable the use of lower bias voltages and consume less energy than conventional designs in which the cladding regions surrounding the waveguide core do not incorporate large electro-optic coefficient materials.

Figure 10:
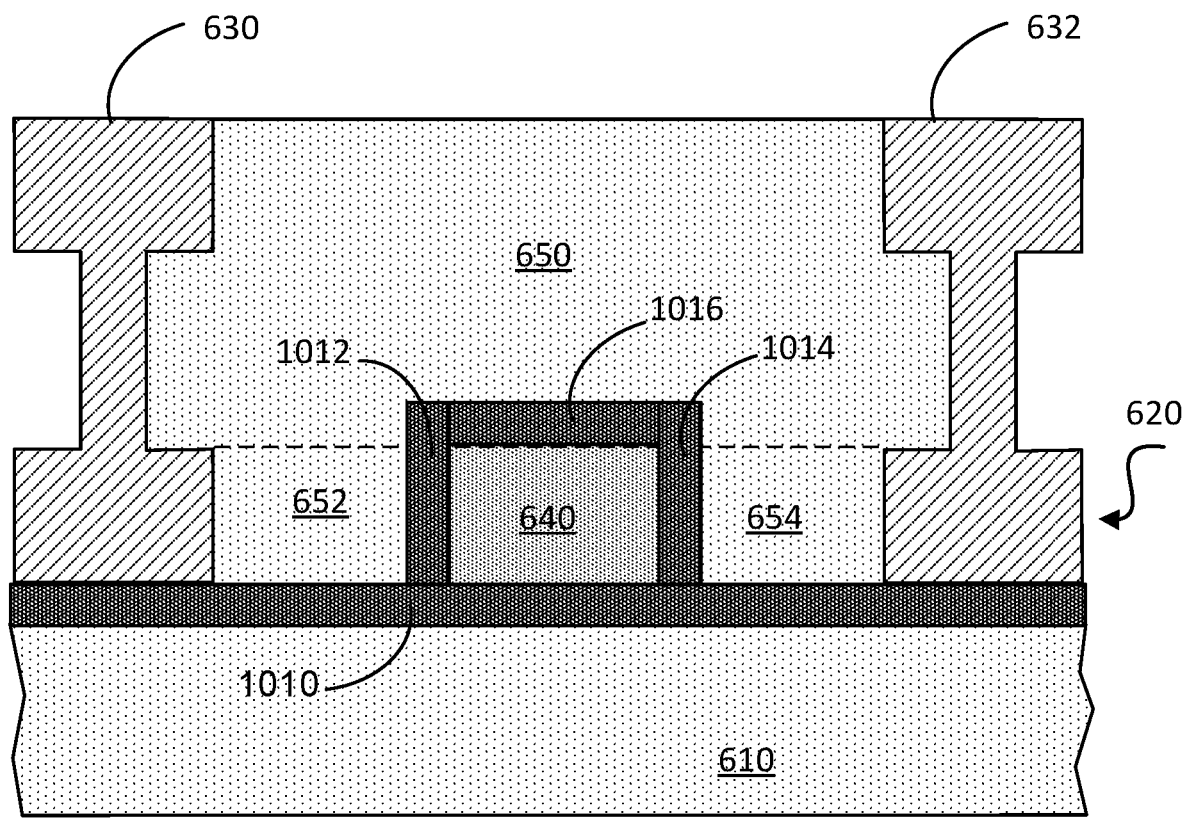
FIG. 10 is a simplified schematic diagram illustrating a dielectric-waveguide-dielectric structure incorporating electro-optic cladding materials according to an embodiment of the present invention.

FIG. 10 is a simplified schematic diagram illustrating a dielectric-waveguide-dielectric structure incorporating electro-optic cladding materials according to an embodiment of the present invention. The dielectric-waveguide-dielectric structure illustrated in FIG. 10 shares similarities with the dielectric-waveguide-dielectric waveguide structure illustrated in FIG. 6 and the discussion provided in relation to FIG. 6 is applicable to FIG. 10 as appropriate.

Referring to FIG. 10, the cross-section of the dielectric-waveguide-dielectric structure includes an illustration of substrate 610, which supports waveguide layer 620, which includes waveguide core 640. In some embodiments, the substrate 610 is the buried oxide (BOX) layer of a silicon-on-insulator (SOI) structure, although this is not required by the present invention. Metal contacts 630 and 632 are provided to enable application of a voltage bias across the silicon waveguide core 640.

The cladding surrounding the waveguide core 640 includes a first cladding layer 1010 disposed below the waveguide core, lateral cladding layers 1012 and 1014 disposed on either side of the waveguide core, and second cladding layer 1016 disposed above the waveguide core. In addition to first cladding layer 1010, lateral cladding layers 1012 and 1014, and second cladding layer 1016, proximal dielectric regions 650, 652, and 654 are disposed with one or more of the lateral cladding layers 1012 and 1014 or second cladding layer 1016 between the proximal dielectric regions and the waveguide core.

First cladding layer 1010, lateral cladding layers 1012 and 1014, and second cladding layer 1016 are characterized by an electro-optic coefficient, for example, a Kerr coefficient $\chi^{(3)}$ that is greater than the Kerr coefficient associated with waveguide core 640 or a Pockels coefficient $\chi^{(2)}$ that is greater than the Pockels coefficient associated with waveguide core 640.

As an example, silicon can be utilized as the waveguide core 640 and hafnium oxide ($HfO_2$) or tantalum oxide ($Ta_2O_5$) can be utilized as first cladding layer 1010, lateral cladding layers 1012 and 1014, and second cladding layer 1016, and silicon dioxide ($SiO_2$) can be used as the proximal dielectric regions 650, 652, and 654. Other suitable materials for first cladding layer 1010, lateral cladding layers 1012 and 1014, and second cladding layer 1016 and/or proximal dielectric regions 650, 652, and 654 include lead zirconate titanate ($Pb[Zr_{(x)}Ti_{(1-x)}]O_3$) (PZT), barium titanate ($BaTiO_3$), strontium barium niobate (($Sr,Ba)Nb_2O_6$), combinations thereof, and the like.

Although different materials are illustrated for first cladding layer 1010, lateral cladding layers 1012 and 1014, and second cladding layer 1016 and proximal dielectric regions 650, 652, and 654, this is not required by the present invention and the same material can be utilized for both first cladding layer 1010, lateral cladding layers 1012 and 1014, and second cladding layer 1016 and proximal dielectric regions 650, 652, and 654. As an example, the entire cladding could be fabricated using tantalum oxide ($Ta_2O_5$), in which case, there would be no distinction between first cladding layer 1010, lateral cladding layers 1012 and 1014, and second cladding layer 1016 and proximal dielectric regions 650, 652, and 654. In other embodiments, different compositions of the same material could be utilized as the various cladding materials. Moreover, although only two cladding layers are illustrated in FIG. 10, it will be appreciated that more than two cladding layers could be used, for example, a thin film of a first cladding material (e.g., tantalum oxide ($Ta_2O_5$)), a thin film of a second cladding material (e.g., $HfO_2$) deposited after the first cladding material, N additional thin films of subsequent cladding materials, and a blanket coating of a final cladding material. Moreover, although a single layer of cladding material is illustrated in FIG. 10 for first cladding layer 1010, lateral cladding layers 1012 and 1014, and second cladding layer 1016, these single "layers" can be made up of multiple sub-layers of different materials or the same material. One of ordinary skill in the art would recognize many variations, modifications, and alternatives.

In order to vary the index of refraction in waveguide core 640, a voltage bias is applied using metal contacts 630 and 632, also referred to as electrodes. Since there is no current conduction path in the dielectric-waveguide-dielectric structure, the bias applied to the electrodes will be dropped across the dielectric region 652 between metal contact 630 and the waveguide core 640, the waveguide core 640, and the dielectric region 654 between the waveguide core 640 and metal contact 632. In addition to use of large electro-optic coefficient materials for the first cladding layer 1010, lateral cladding layers 1012 and 1014, and second cladding layer 1016, dielectric region 652 and/or dielectric region 654 can also utilize large electro-optic coefficient materials. Moreover, substrate 610 can utilize large electro-optic coefficient materials in some embodiments.

As discussed above, the incorporation of the large electro-optic coefficient materials for one or more cladding layers will result in an increased percentage of the electric field being dropped across the waveguide core, thereby either increasing the index of refraction change at a given voltage bias or providing a given index of refraction change at a lower voltage bias.

It should be noted that a "vertical" implementation of the dielectric-waveguide-dielectric structure incorporating large electro-optic coefficient materials illustrated in FIG. 10 are included within the scope of the present invention. Dielectric region 652 and 654, as well as waveguide core 640 can be formed using epitaxial processes to form a vertical implementation that will share common elements with the embodiment illustrated in FIG. 10 and provide benefits of smaller device geometry as well as other benefits. One of ordinary skill in the art would recognize many variations, modifications, and alternatives.

Figure 11:
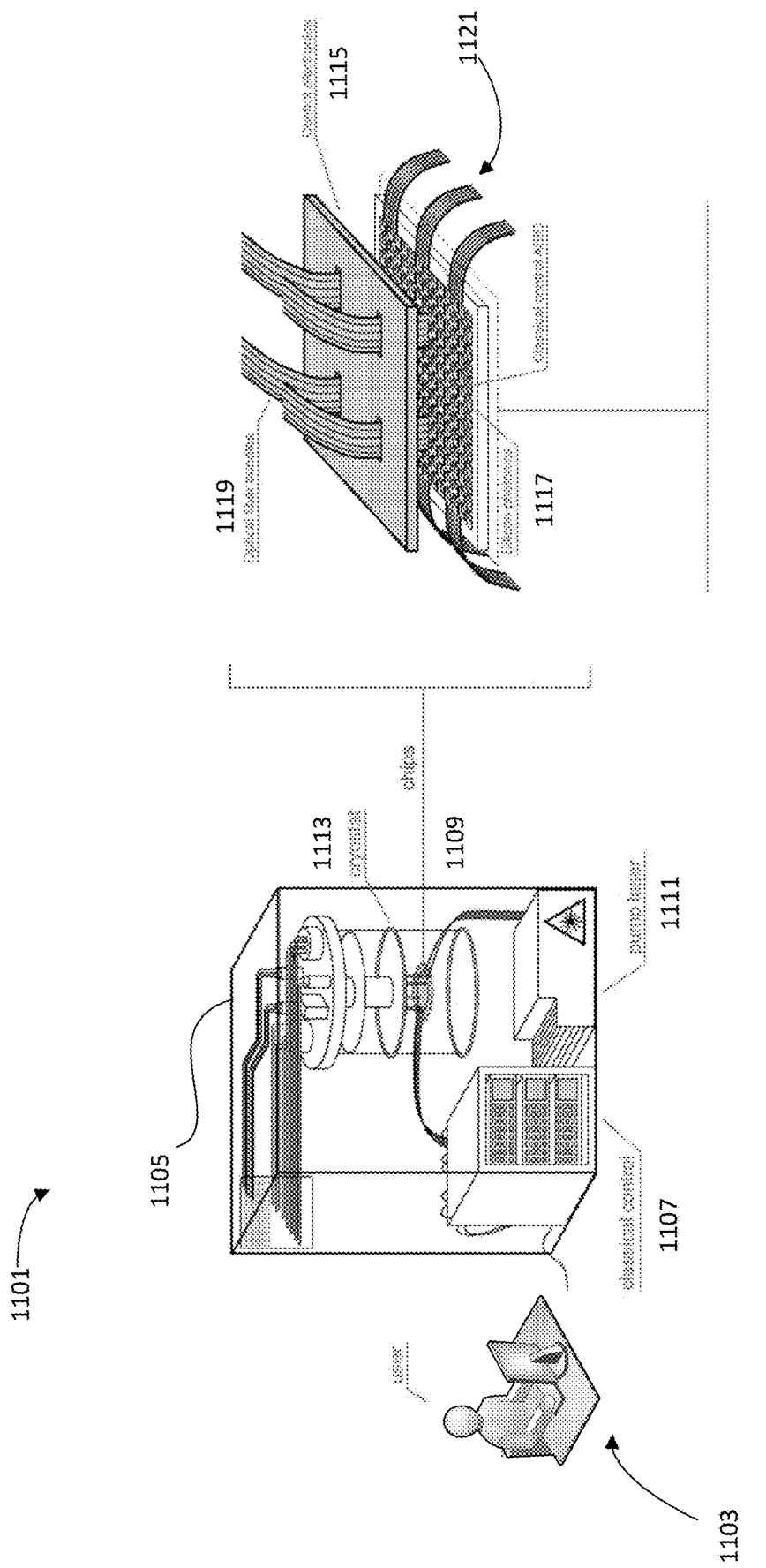
FIG. 11 is a simplified system diagram illustrating incorporation of an electro-optic switch with a dewar according to an embodiment of the present invention.

FIG. 11 is a simplified system diagram illustrating incorporation of an electro-optic switch with a cryostat according to an embodiment of the present invention. In order to operate at low temperatures, for example liquid helium temperatures, embodiments of the present invention integrate the electro-optic switches discussed herein into a system that includes cooling systems. Thus, embodiments of the present invention provide a hybrid computing system, for example, as illustrated in FIG. 11. The hybrid computing system 1101 includes a user interface device 1103 that is communicatively coupled to a hybrid quantum computing (QC) sub-system 1105. The user interface device 1103 can be any type of user interface device, e.g., a terminal including a display, keyboard, mouse, touchscreen and the like. In addition, the user interface device can itself be a computer such as a personal computer (PC), laptop, tablet computer and the like. In some embodiments, the user interface device 1103 provides an interface with which a user can interact with the hybrid QC subsystem 1105. For example, the user interface device 1103 may run software, such as a text editor, an interactive development environment (IDE), command prompt, graphical user interface, and the like so that the user can program, or otherwise interact with, the QC subsystem to run one or more quantum algorithms. In other embodiments, the QC subsystem 1105 may be pre-programmed and the user interface device 1103 may simply be an interface where a user can initiate a quantum computation, monitor the progress, and receive results from the hybrid QC subsystem 1105. Hybrid QC subsystem 1105 further includes a classical computing system 1107 coupled to one or more quantum computing chips 1109. In some examples, the classical computing system 1107 and the quantum computing chip 1109 can be coupled to other electronic components 1111, e.g., pulsed pump lasers, microwave oscillators, power supplies, networking hardware, etc.

In some embodiments that utilize cryogenic operation, the quantum computing system 1109 can be housed within a cryostat, e.g., cryostat 1113. In some embodiments, the quantum computing chip 1109 can include one or more constituent chips, e.g., hybrid electronic chip 1115 and integrated photonics chip 1117. Signals can be routed on- and off-chip any number of ways, e.g., via optical interconnects 1119 and via other electronic interconnects 1121. In addition, the hybrid computing system 1101 may employ a quantum computing process, e.g., measurement-based quantum computing (MBQC) that employs one or more cluster states of qubits.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An optical switch structure comprising:
   a substrate;
   a first electrical contact;
   a first material having a first conductivity type electrically connected to the first electrical contact;
   a second material having a second conductivity type coupled to the first material;
   a second electrical contact electrically connected to the second material; and
   a waveguide structure disposed between the first electrical contact and the second electrical contact and comprising:
   a waveguide core coupled to the substrate and including a core material characterized by a first index of refraction and a first electro-optic coefficient; and
   a waveguide cladding at least partially surrounding the waveguide core and including a cladding material characterized by a second index of refraction and a second electro-optic coefficient, wherein:
   the first index of refraction is greater than the second index of refraction; and
   the first electro-optic coefficient is less than the second electro-optic coefficient.

2. The optical switch structure of claim 1 wherein the first electro-optic coefficient and the second electro-optic coefficient are the Kerr coefficient $x^{(3)}$.

3. The optical switch structure of claim 1 wherein the first electro-optic coefficient and the second electro-optic coefficient are the Pockels coefficient $x^{(2)}$.

4. The optical switch structure of claim 1 wherein:
   the first electric contact and the second electrical contact are configured to generate an applied electric field produced in the waveguide structure that is characterized by a direction; and
   the waveguide cladding is characterized by an electro-optic coefficient tensor having a maximum value aligned along the direction.

5. The optical switch structure of claim 4 wherein a guided mode supported by the waveguide core has a direction of polarization aligned with the direction.

6. The optical switch structure of claim 4 wherein the waveguide cladding is characterized by a DC Kerr effect and a Pockels effect having a same sign.

7. The optical switch structure of claim 6 wherein the DC Kerr effect is positive and the Pockels effect is positive.

8. The optical switch structure of claim 7 wherein the waveguide cladding comprises a first material type, a majority of polarization domains are aligned with a positive z-direction, and a direction of the applied electric field is negative.

9. The optical switch structure of claim 7 wherein the waveguide cladding comprises a first material type, a majority of polarization domains are aligned with a negative z-direction, and a direction of the applied electric field is positive.

10. The optical switch structure of claim 7 wherein the waveguide cladding comprises a second material type, a majority of polarization domains are aligned with a positive z-direction, and a direction of the applied electric field is positive.

11. The optical switch structure of claim 7 wherein the waveguide cladding comprises a second material type, a majority of polarization domains are aligned with a negative z-direction, and a direction of the applied electric field is negative.

12. The optical switch structure of claim 1 wherein the core material comprises silicon.

13. The optical switch structure of claim 1 wherein the core material consists of silicon.

14. The optical switch structure of claim 1 wherein the cladding material comprises $HfO_2$.

15. The optical switch structure of claim 1 wherein the cladding material comprises $Ta_2O_5$.

* * * * *